United States Patent
Doerner et al.

(10) Patent No.: US 10,761,758 B2
(45) Date of Patent: Sep. 1, 2020

(54) DATA AWARE DEDUPLICATION OBJECT STORAGE (DADOS)

(71) Applicant: Quantum Corporation, San Jose, CA (US)

(72) Inventors: Don Doerner, San Jose, CA (US); Michael Zeis, San Jose, CA (US); Roderick Wideman, Shakopee, MN (US); Greg Wade, San Jose, CA (US); Steve Lord, Prior Lake, MN (US); Turguy Goker, San Jose, CA (US)

(73) Assignee: Quantum Corporation, San Jose, CA (US)

( * ) Notice: Subject to any disclaimer, the term of this patent is extended or adjusted under 35 U.S.C. 154(b) by 584 days.

(21) Appl. No.: 15/386,484

(22) Filed: Dec. 21, 2016

(65) Prior Publication Data

US 2017/0177266 A1    Jun. 22, 2017

Related U.S. Application Data

(60) Provisional application No. 62/270,109, filed on Dec. 21, 2015.

(51) Int. Cl.
*G06F 16/22*    (2019.01)
*G06F 3/06*    (2006.01)
(Continued)

(52) U.S. Cl.
CPC .......... *G06F 3/0641* (2013.01); *G06F 3/0608* (2013.01); *G06F 3/0689* (2013.01);
(Continued)

(58) Field of Classification Search
CPC ............. G06F 16/1752; G06F 16/2255; G06F 16/137; G06F 2212/154; G06F 2212/261; G06F 2212/263; G06F 2212/7205
See application file for complete search history.

(56) References Cited

U.S. PATENT DOCUMENTS 6,233,704 B1 * 5/2001 Scott ..................... G06F 13/426
                                                    709/200
7,161,506 B2    1/2007 Fallon
(Continued)

OTHER PUBLICATIONS

Lu et al. "BloomStore: Bloom-Filter based Memory-efficient Key-Value Store for Indexing of Data Deduplication on Flash", 2013, IEEE. (Year: 2013).*

(Continued)

*Primary Examiner* — Apu M Mofiz
*Assistant Examiner* — Sheryl L Holland
(74) *Attorney, Agent, or Firm* — Eschweiler & Potashnik, LLC

(57) ABSTRACT

Embodiments include a data aware deduplicating object store. The data aware deduplicating data store includes a consistent hashing logic that manages a consistent hashing architecture for the object store. The consistent hashing architecture includes a metadata ring and a bulk ring. The consistent hashing architecture may be a multiple ring architecture comprising a metadata ring and two or more bulk rings. A bulk ring may include a key/value (k/v) data store, where a k/v data store stores a shard of an index and a reference count that facilitates the individual approach to garbage collection or data reclamation. The data aware deduplicating data store also includes a deduplication logic that provides data deduplication for data to be stored in the object store. The deduplication logic performs variable length deduplication and provides a shared nothing approach.

23 Claims, 18 Drawing Sheets

(51) Int. Cl.
  *G06F 12/02*   (2006.01)
  *G06F 16/13*   (2019.01)
  *G06F 16/174*  (2019.01)

(52) U.S. Cl.
  CPC ...... *G06F 12/0246* (2013.01); *G06F 12/0253* (2013.01); *G06F 12/0261* (2013.01); *G06F 16/137* (2019.01); *G06F 16/1752* (2019.01); *G06F 16/2255* (2019.01); *G06F 2212/1016* (2013.01); *G06F 2212/154* (2013.01); *G06F 2212/163* (2013.01); *G06F 2212/261* (2013.01); *G06F 2212/262* (2013.01); *G06F 2212/263* (2013.01); *G06F 2212/7205* (2013.01)

(56) References Cited

U.S. PATENT DOCUMENTS

| | | | |
|---|---|---|---|
| 7,378,992 B2 | 5/2008 | Fallon | |
| 7,415,530 B2 | 8/2008 | Fallon | |
| 8,621,182 B1* | 12/2013 | Sorenson, III | H04L 67/1097 711/216 |
| 8,643,513 B2 | 2/2014 | Fallon | |
| 9,054,728 B2 | 6/2015 | Fallon | |
| 9,116,908 B2 | 8/2015 | Fallon | |
| 9,292,350 B1* | 3/2016 | Pendharkar | G06F 9/5044 |
| 9,378,088 B1* | 6/2016 | Piszczek | G06F 16/182 |
| 2008/0270436 A1* | 10/2008 | Fineberg | G06F 16/137 |
| 2009/0100055 A1* | 4/2009 | Wang | G06F 21/564 |
| 2010/0077013 A1* | 3/2010 | Clements | G06F 16/1748 707/822 |
| 2011/0276744 A1* | 11/2011 | Sengupta | G06F 12/0866 711/103 |
| 2013/0159449 A1* | 6/2013 | Taylor | G06F 15/167 709/212 |
| 2013/0185258 A1* | 7/2013 | Bestler | G06F 16/1824 707/638 |
| 2013/0268740 A1* | 10/2013 | Holt | G06F 21/00 711/163 |
| 2015/0121131 A1* | 4/2015 | Kiselev | G06F 16/21 714/6.23 |
| 2016/0062834 A1* | 3/2016 | Benight | G06F 16/22 714/766 |
| 2016/0188591 A1* | 6/2016 | Bestler | G06F 16/2255 707/744 |
| 2016/0246676 A1* | 8/2016 | Bakre | G06F 11/1076 |
| 2016/0342588 A1* | 11/2016 | Judd | G06F 16/137 |
| 2016/0378846 A1* | 12/2016 | Luse | G06F 16/122 707/740 |

OTHER PUBLICATIONS

Z. Huang, "DNN: A Distributed NameNode Filesystem for Hadoop", 2014, University of Nebraska. (Year: 2014).*

* cited by examiner

DATA AWARE DEDUPLICATION OBJECT STORAGE (DADOS)

CROSS REFERENCE TO RELATED APPLICATIONS

This application claims the benefit of U.S. Provisional Application 62/270,109 filed Dec. 21, 2015.

BACKGROUND

Consistent hashing has been used in a number of different data storage systems and architectures. In a consistent hashing architecture, the hash space is divided up into a number of partitions. The number of partitions is related to the number of nodes on a ring supporting the consistent hashing architecture. For example, the number of partitions may equal the number of nodes on the ring, may be double the number of nodes on the ring (e.g., two partitions per node), or may have another relation. There are design tradeoffs in consistent hashing architectures. For example, consistent hashing may produce load balancing between multiple nodes in a multiple-node system. The load balancing may or may not be desirable depending on the application that the consistent hashing architecture is supporting.

Conventionally, consistent hashing architectures have been used to distribute data evenly on a ring. Conventionally, the data has just been data. Conventionally, any work (e.g., data awareness, replication, erasure coding, analytics) to be performed on the data has been performed by a separate entity (e.g., process, apparatus). The separate entity has typically been located on a device other than the data storage device on which the data is stored. Before any work could be performed on the data stored by a consistent hashing system, the separate entity had to find the data using the consistent hashing system. This may be inefficient.

Data storage systems of various architectures may implement variable length deduplication. Conventional deduplication systems that use a conventional global index may also use a Bloom filter to improve efficiency. Recall that one step in deduplication is determining whether a chunk produced from an item is already stored in a chunk repository. A Bloom filter is a space-efficient probabilistic data structure that is used to test whether an element is a member of a set. In deduplication, a Bloom filter may be used to test whether a chunk is in a chunk repository. A Bloom filter can report, with 100% certainty, that a chunk is not located in a chunk repository. This facilitates determining whether a chunk needs to be stored in the repository. A Bloom filter may, however, also be susceptible to false positives.

Properties of Bloom filters make them suitable for testing set membership in a deduplication system. For example, elements can be added to the set (e.g., chunk repository) protected by the Bloom filter but cannot be removed. This is similar to how chunks are added to a repository but rarely removed.

While a monolithic Bloom filter is useful, it may be difficult to manage, particularly as the global index it is associated with grows beyond certain sizes. Additionally, adding more elements to a set may increase the amount of space needed for the Bloom filter and may increase the probability of a false positive. Thus, a single large monolithic Bloom filter may be suboptimal for some deduplication applications.

Data storage systems may employ erasure coding. In a conventional deduplication system, erasure coding may be performed at ingest before items have been deduplicated. This approach may involve processing and distributing data that may end up not being stored because it is duplicate data. This is inefficient. Producing erasure codes for data that does not get stored is a waste of processing cycles, memory, and electricity.

In a conventional deduplication system, erasure coding may be performed for data that may never experience a failure. Once again, this is inefficient. Producing erasure codes for data that remains intact for its entire life is a waste of processing cycles, memory, and electricity.

When an architecture includes multiple physical devices, the devices have to be located in actual places. The physical devices need to be connected or "plugged in" to an infrastructure that provides electricity and connectivity. Positioning (e.g., plugging in, rack mounting) a physical device involves a physical action that is most likely performed by a human. Humans are fallible, and may be slow and error prone.

When a large number of storage devices (e.g., disks, tape drives) are involved, a large number of racks may be required to house the devices. When multiple devices and multiple racks are involved, one or more devices may end up in an incorrect location due to human fallibility. It may be difficult and time consuming to determine where a device is actually located and where that device is supposed to be located. The locations may be physical (e.g., rack) or may be logical (e.g., metadata ring, bulk ring).

Traditionally, storage devices do not manage their own capacity space. Instead, storage devices (e.g., disk drives) are organized by file systems, which track block allocations organized as files. As files are deleted and blocks are freed, only the file system is aware of what has happened. The storage device has no self-awareness of which blocks have been freed. Thus, the storage device is not able to act on its own to reclaim freed blocks.

The performance of some storage devices, including a flash disk, may be negatively affected by the presence of unused blocks. Thus, external actors have monitored storage devices and controlled them to reclaim space. Conventionally, a 'TRIM' command was used by file systems to inform storage devices (e.g., flash disk) about which blocks were no longer in use. The flash disk could then perform garbage collection of the unused blocks to mitigate the performance penalty associated with the unused blocks. However, this approach is still controlled, at least partially, off-device. The storage device itself may not be aware of the status of all blocks. For example, the storage device may not be aware of which blocks are in use and which blocks are not in use. That knowledge is still maintained external to the storage device.

Some storage devices (e.g., Shingled Magnetic Recording (SMR) drives) perform device-specific garbage collection operations to reclaim space. The devices may need to perform unique operations due, for example, to the way data is laid out on the media in the device. An SMR drive may require assistance from a host to gain awareness of what areas or zones on the SMR drive contain active data. An SMR drive may also require assistance from a host to gain awareness of when it would be most effective to re-write data to consolidate space on the SMR drive. Once again, the storage device depends on the actions of a process or circuit located off the storage device.

Object storage devices handle their own storage allocation for data placement. However, object storage devices may still not know what data is active and what data is inactive (e.g., no longer in use). Conventional object storage devices may write whole objects under the control of a client or application that is using the object storage device. Similarly, whole objects may be deleted from a conventional object storage device under the control of the client or application using the object storage device. In these conventional object storage devices, the object storage device cannot recover storage space on its own.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
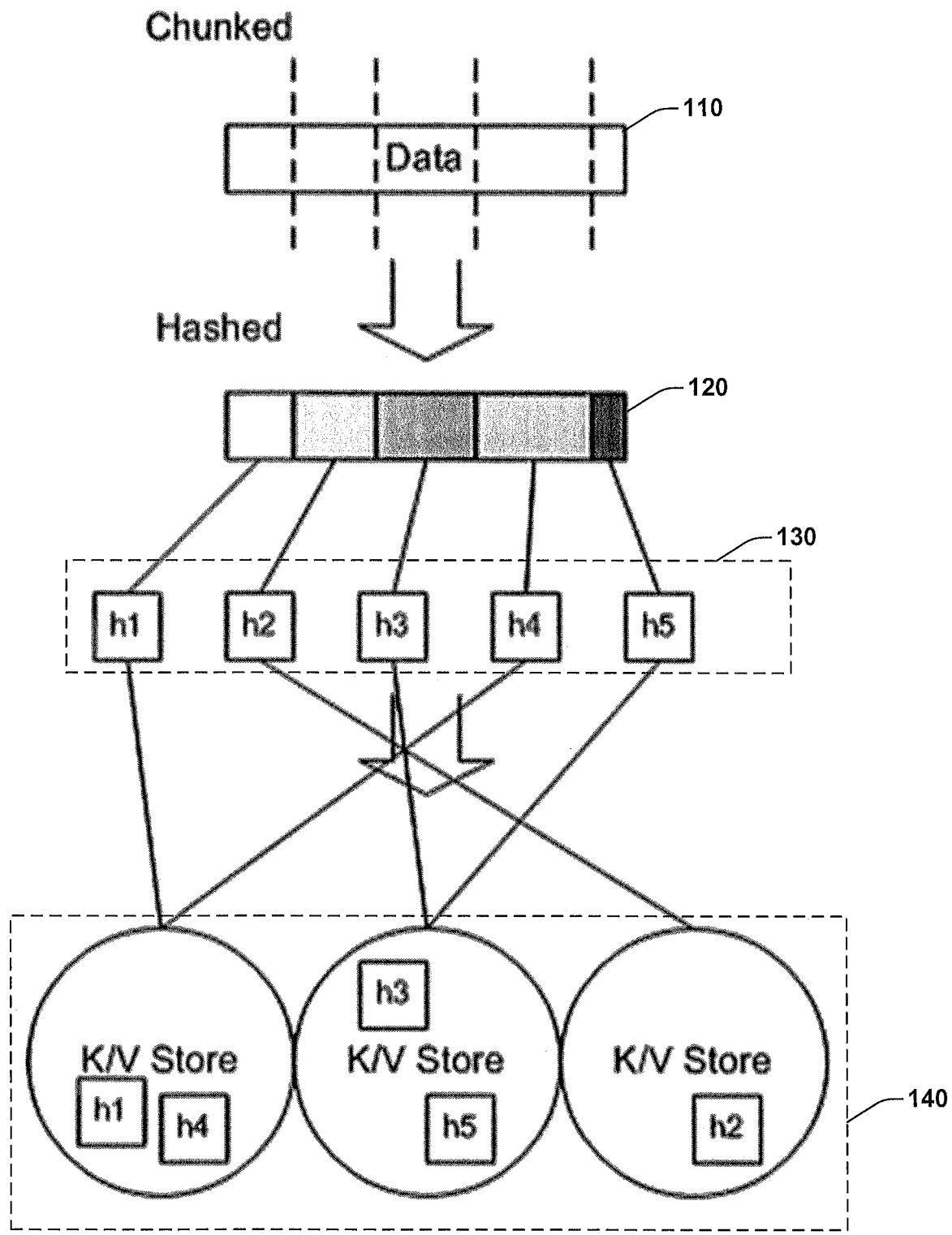
FIG. 1 illustrates an approach to consistent hashing for a first data.

Example embodiments described herein employ consistent hashing (CH) with variable length deduplication and shared nothing access. Consistent hashing has been used in several different data storage systems and architectures. Variable length deduplication has also been implemented for a number of different data storage systems and architectures. Example apparatus and methods use a consistent hashing approach in combination with deduplication that produces chunks using variable length deduplication. The chunks are stored on a plurality of nodes that provide a key/value (k/v) interface for storing items on the nodes.

Example embodiments described herein employ a dual ring approach to CH with variable length deduplication and shared nothing access. One example system architecture includes two consistent hashing rings. Metadata about the chunks is stored in a metadata ring and the chunks are stored in a bulk ring. The bulk ring uses nodes that have a k/v interface to which chunks are presented for storage. The combination of consistent hashing and the key/value interfaces mitigates or even eliminates the "global index" problem associated with conventional deduplication schemes. Additionally, using two rings mitigates or eliminates down time associated with adding capacity to a conventional consistent hashing architecture.

Example apparatus and methods use a consistent hashing approach to deterministically direct chunks produced by variable length deduplication to the bulk ring and metadata about the chunks to the metadata ring. While two rings are described, in one embodiment, there may only be a single physical ring that stores both chunks and metadata. In one embodiment, the single ring may be implemented on a single machine or data storage device. In one embodiment, the two rings may be implemented on two or more machines or data storage devices.

Nodes in the bulk ring have k/v interfaces that are used to store the chunks. The keys in the k/v pair are the hash values generated by the consistent hashing approach. The values in the k/v pair are the chunks that are hashed or the metadata about the chunks.

The architecture is arranged so that the hash function available to the consistent hashing approach places metadata about the chunks on the metadata ring. The architecture is also arranged so that the hash function available to the consistent hashing approach places the chunks on the bulk ring. Since the hash function is deterministic and repeatable, the hash function is also used to locate metadata on the metadata ring. The metadata located on the metadata ring facilitates locating chunks on the bulk ring.

During ingest, a larger item (e.g., object, file) can be broken up into a plurality of chunks. With variable length deduplication, the chunks may have different sizes. The identities of the chunks needed to recreate the larger item may be stored in a "recipe". The recipe is metadata that may be stored on the metadata ring. The recipe may be stored at a location on the metadata ring that is determined by, for example, a hash of an identifier (e.g., file name) of the larger item that was chunked. Members of the plurality of chunks associated with the recipe are stored on the bulk ring and are located by metadata stored in the metadata ring.

One example approach chunks a larger item (e.g., file) into smaller chunks (e.g., variable length deduplication chunks), hashes an identifier (e.g., filename) of the larger item, and stores metadata about the larger item on the metadata ring. The metadata may be stored at a location on the metadata ring that is determined by the hash of the identifier.

The smaller chunks are then hashed and sent to a k/v node on the bulk ring based on the hash value. In this embodiment, the hash is the key, and the chunk is the value. The metadata may be updated with location information for the stored chunks. When a chunk arrives at a k/v node, the k/v node can decide how or even whether to store a smaller chunk based on the key/hash and its own local index. A k/v node can also decide how to do other local processing including, for example, garbage collection, power/energy manipulation, replication, and RAID (redundant arrays of independent disks). Different k/v nodes in the bulk ring may perform local processing differently. For example, one k/v node may decide to protect data using erasure codes while another k/v node may decide to protect data using replication. Different processing can be performed at different k/v nodes because nodes are, logically, just object stores and may act independently so long as they provide the k/v interface. Example apparatus and methods may enhance the object stores to be data aware object stores.

In one embodiment, different nodes have their own "shard" of what would conventionally have been the "global index" in a deduplication system. Instead of using the conventional global index to locate chunks, metadata on the metadata ring and hash values computed by the hash function in the consistent hashing architecture are used to locate a partition in which a chunk is stored. Once the partition is identified, the k/v interface available to a k/v node(s) that supports the partition can be used to acquire the chunk. The k/v node(s) may have their own index for the chunks they store.

Members of the plurality of chunks into which the larger item was broken are hashed by the consistent hashing approach to produce a hash value. The hash value is used to direct the chunk to a node in the bulk ring. Different hash values cause different chunks to be directed to different nodes in the bulk ring. Thus, not all the chunks needed to recreate an item may be found on a single node in the bulk ring.

A hash function has a finite number of hash values that it can produce. The finite number of hash values may be referred to as a hash space. The hash space needs to be larger than the anticipated index space for the chunks. Conventionally, as the index space for a deduplication architecture grew, the amount of storage required to store the global index produced significant efficiency issues. Using a consistent hash approach mitigates or even eliminates the expanding index problem because a hash function with an adequate hash space can be selected to accommodate different index spaces.

In a consistent hashing architecture, the hash space is divided up into a number of partitions. The number of partitions is related to the number of nodes on the ring supporting the consistent hashing approach. For example, the number of partitions may equal the number of nodes on the ring, may be double the number of nodes on the ring (e.g., two partitions per node), or may have another relation.

One of the rationales for layering a consistent hashing architecture on a data storage system is how easy it is to add capacity to the data storage system using the consistent hashing architecture. For example, capacity can be added by subdividing a partition of the hash space and assigning the subdivided partitions to different nodes. Completely new nodes may be used to support the subdivided partitions or the original node may be used along with one or more new nodes. Some chunks stored on the original node associated with the undivided partition may be moved to the new node(s) associated with one of the new subdivisions of the partition. Some chunks stored on the original node associated with the undivided partition may remain on the original node.

Example apparatus and methods provide a "shared nothing" approach in which visibility and access to data and metadata is limited. In one embodiment, the hash function available to the consistent hashing architecture is deterministic and repeatable. In this embodiment, visibility into the data storage system may be limited to an interface to the hash function. At ingest time, users of the data storage system present objects (e.g., chunks) and identifiers (e.g., file name) to the consistent hashing architecture. The hash function produces metadata (e.g., hash value) for the chunk. The chunk can then be stored on a node on the bulk ring, where the node is identified by the partition in which the hash value falls. The partition on which the chunk is stored may be recorded in the metadata. The metadata can be stored on the metadata ring at a location associated with identifiers associated with the chunk (e.g., recipe identifier, ring identifier, file name hash).

At read time, when a larger item (e.g., file) is to be recreated, an identifier (e.g., file name, hash of file name) can be used to find metadata (e.g., recipe) on the metadata ring. The recipe can then be used to find metadata on the metadata ring from which the chunks needed to recreate the larger item can be located.

Example embodiments described herein may employ a dual-ring or multi-ring approach. There are design tradeoffs in consistent hashing architectures. For example, consistent hashing may produce load balancing between multiple nodes in a multiple-node system. The load balancing may or may not be desirable depending on the application that the consistent hashing architecture is supporting.

The load balancing may facilitate improving performance and efficiency in the multiple-node system when it facilitates having nodes work equally and in parallel. When the consistent hashing hash is substantially uniform and when the ring to which the consistent hashing distributes items is substantially equally partitioned, then the load balancing facilitates improved performance from better device utilization. This may be desirable for certain data storage applications, but may be undesirable for others. For example, this may be appropriate for a system where a majority of the stored data is touched frequently, but this may be inappropriate for a deduplication system where some data is rarely, if ever, touched.

Consider that when a load is balanced between all or any of the nodes, then the nodes are always in use. Since the nodes are always in use, none of the nodes can be turned off for cold storage or powered down for energy saving. In a deduplication system, many chunks may never be accessed. As new data is ingested, conventional approaches may determine that the chunks for recreating the incoming file or object are already stored on the bulk ring. When all the chunks are already stored, only the recipe for the item needs to be stored on the metadata ring. Thus, a new item could be ingested without ever touching data on the bulk ring. Only the metadata ring may be touched.

If a new chunk is encountered during ingest, then that new chunk may be written to the bulk ring. However, writing the new chunk to the bulk ring may not cause the chunks already stored on the bulk ring to be touched. Since many chunks may never be touched, it may be desirable to turn off some of the nodes on the bulk ring that are providing the deduplication repository. Using two or more rings instead of a single ring may facilitate selectively turning off some nodes in the bulk ring. Selectively turning off some nodes in the bulk ring may improve the power efficiency of a data storage system and conserve electricity compared to conventional approaches.

In one embodiment, a metadata ring may be supported by a first type of device that is always on. For example, the metadata ring may be implemented in memory (e.g., flash memory). In this embodiment, a bulk ring may be supported by a second, different type of device that can be selectively turned on or off. For example, the bulk ring may be supported by nodes including disk drives, SMR drives, tape drives, or other devices. To provide additional protection, chunks may be replicated on devices that are part of neither the metadata ring nor the bulk ring.

In one embodiment, the metadata ring and the bulk ring may be implemented on a single device. In another embodiment, the metadata ring and the bulk ring may be implemented on separate devices. The numbers of rings may be independent of the number of devices available to support or implement the rings.

In one embodiment, the metadata ring may be a CH architecture ring that responds to additional capacity requirements using CH techniques. However, the bulk ring(s) may not necessarily be a traditional consistent hashing architecture ring and may respond to additional capacity requirements in different ways. Recall that the bulk ring may be implemented by a set of k/v addressable nodes. As a bulk ring fills, instead of adding capacity in a conventional manner, the bulk ring could be turned off for ingest and an additional bulk ring could be added to store subsequently arriving chunks. A bulk ring that has been turned off for ingest may remain powered off until chunks stored on that ring are read. This facilitates improving power and electrical efficiency in the system compared to conventional approaches.

In one embodiment, storage devices that are optimized for rapidly storing chunks may be used to provide a bulk ring that supports an ingest process. Once the bulk ring has reached a threshold capacity, it may no longer be used for ingest. A process that does not interrupt read access to the storage devices that supported the now over capacity bulk ring may copy data from the bulk ring to storage devices that are optimized for read access. The storage devices that are optimized for read access may be more power efficient than the storage devices optimized for ingest. Once all the data or a threshold amount of data from the over capacity bulk ring that was used for ingest has been copied to the new bulk ring that will be used for read only, then reads may subsequently be directed to the read optimized devices that form the new ring. The write optimized devices may then become available for another round of ingest.

In one embodiment, a bulk ring or rings can be multi-generational. For example, data ingested during a first (e.g., earlier) period of time may be stored on a first ring while data ingested during a second (e.g., later) period may be stored on a second ring. In another example, data stored during different periods of time (e.g., T1, T3, T5, . . . ) may be stored on a first ring while data stored during other periods of time (e.g., T2, T4, T6, . . . ) may be stored on a second ring. Other sets of rings may be configured to store chunks associated with other permutations or combinations of time periods. Having rings that are generational or multi-generational may facilitate supporting temporal based proximity for improving read performance. For example, chunks that are ingested and written near the same point in time may be part of a larger item and thus, when the larger item needs to be recreated, the chunks may also be read at a similar point in time. Thus, in one embodiment, the consistent hashing architecture may include temporal considerations in its hashing functions. For example, a hash value mapping to a location may have a temporal component. The temporal component may be included in the metadata recipe for recreating the data.

Example embodiments may supplement a bulk ring or rings with an additional bulk ring or rings. Supplementing a bulk ring with an additional bulk ring provides a suitable architecture for deduplication applications where a chunk repository may be added to but rarely deleted from, and where the chunk repository may have portions that are rarely accessed.

When multiple different bulk rings are available, the different rings may be configured differently. For example, some rings may be configured with different types of devices including disk drives, tape drives, or cloud storage. Some rings may have different performance levels, including different write latencies or different read latencies. Some rings may have different capacities. Some rings may have different protection levels or different protection types. By way of illustration, a first ring may have a 9/3 erasure code scheme, a second ring may have an 11/4 erasure code scheme, a third ring may use one type of RAID, a fourth ring may use another, different type of RAID, and a fifth ring may use off-ring replication. Additionally, different rings may employ different power management approaches. These types of attributes (e.g., performance level, protection type, protection level, power management, capacity) may be controlled, for example, by a service level agreement (SLA). In different embodiments, the attributes may be controlled collectively at the ring level or may be controlled individually at the node level. The attributes may be controlled dynamically.

Example embodiments facilitate placing work along with data on the k/v nodes. Conventionally, consistent hashing architectures have been used to distribute data evenly on a ring. Conventionally, the data has just been data. Conventionally, any work (e.g., data awareness, replication, erasure coding, analytics) to be performed on the data has been performed by a separate entity (e.g., process, apparatus). The separate entity has typically been located on a device other than the data storage device on which the data is stored. Before any work could be performed on the data stored by a consistent hashing system, the separate entity had to find the data using the consistent hashing system. This may be inefficient.

Recall that a k/v pair device can store "values" at locations identified by the keys. Conventionally, the "values" have been data (e.g., chunks) and just data. Example apparatus and methods facilitate having a more expansive view of the values that are stored at the different locations. For example, the "values" may be data but may also be processing (e.g., work) to be performed on the data. In one embodiment, the "values" could also be just processing (e.g., work) to be performed at the k/v node.

Allowing work to be placed with data facilitates producing a data aware object store. For example, the processing that is stored on a k/v node along with the data could be "data awareness" work that helps the consistent hashing system be more self-aware. The self-awareness may extend beyond simple metadata-awareness (e.g., how many files are stored, what is their average size). The self-awareness may extend to content awareness where the data in a chunk is analyzed, rather than just the data about a chunk.

In a dual-ring architecture, being able to place work with data on a k/v node provides opportunities for data awareness that may be unavailable to network attached storage (NAS). In an NAS architecture, it may be difficult, if even possible at all, to balance data awareness work. It may be difficult to load balance data awareness work between nodes because the work is typically performed by a single central actor. The single central actor may access devices in turn and achieve little if any parallelism or balancing.

Example embodiments employing a dual-ring architecture in which nodes are independent devices that provide k/v interfaces more effectively balance data awareness work by placing work with the data. Placing work with the data in a node that provides a k/v interface allows the individual nodes to perform the work in parallel, without central control. The nodes may perform the work in their own way on their own schedule and report results back to an aggregator or central location, but the work may still be done in parallel. This facilitates improving efficiency over conventional NAS architectures where metadata awareness work is performed by a single actor in a single location.

Embodiments described herein may employ a sharded Bloom filter. Conventional deduplication systems that use a conventional global index may also use a Bloom filter to improve efficiency. Recall that one step in deduplication is determining whether a chunk produced from an item is already stored in a chunk repository. A Bloom filter is a space-efficient probabilistic data structure that is used to test whether an element is a member of a set. In deduplication, a Bloom filter may be used to test whether a chunk is in a chunk repository. A Bloom filter can report, with 100% certainty, that a chunk is not located in a chunk repository. This facilitates determining whether a chunk needs to be stored in the repository. A Bloom filter may, however, be susceptible to false positives.

Properties of Bloom filters make them suitable for testing set membership in a deduplication system. For example, elements can be added to the set (e.g., chunk repository) protected by the Bloom filter but cannot be removed, which is similar to how chunks are added to a repository but rarely removed.

While a monolithic Bloom filter is useful, it may be difficult to manage, particularly as the global index it is associated with grows beyond certain sizes. Additionally, adding more elements to a set increases the amount of space needed for the Bloom filter and increases the probability of a false positive. Thus, a single large monolithic Bloom filter may be suboptimal for some deduplication applications.

Example apparatus and methods that employ a consistent hashing architecture mitigate issues associated with single large Bloom filters by associating smaller portions of what would otherwise be the omnibus Bloom filter with k/v nodes in the bulk ring. The portion of the Bloom filter associated with a k/v node may be referred to as a shard of the Bloom filter. The shard of the Bloom filter only needs to be big enough to support the k/v node, not the entire chunk repository.

Different embodiments may store shards of the Bloom filter in different locations. In one embodiment, shards may be stored in k/v nodes in the bulk ring. In another embodiment, the shard may be stored above the metadata ring. Where the shards are stored affects the performance of the Bloom filter. When the shards are stored above the metadata ring, then the entire Bloom filter may be available to a presentation layer and may be consulted at ingest time for an item (e.g., file, object). When the shards are stored below the metadata ring in, for example, the k/v nodes on the bulk ring, then less than the entire Bloom filter is available at ingest time. Thus, when the shards are stored in the k/v nodes on the bulk ring, working at a higher (e.g., file, object) level would require coordinating recognition of the pieces of an item being processed.

One application for a sharded Bloom filter is content awareness. Recall that example apparatus and methods provide a data aware deduplicating object store. A sharded Bloom filter may be configured to help determine whether chunks sufficient to recreate an entire object are present in the bulk ring. The object to be recreated may be a desirable item or may be an undesirable item. A desirable item may be, for example, an actual file, while an undesirable item may be, for example, a computer virus. For example, a "recipe" for a computer virus may be stored and Bloom filters for various k/v nodes may be queried to determine whether all the pieces of the computer virus are stored in the bulk ring. Example embodiments may employ a sharded Bloom filter to detect a recombinant virus whose chunks are distributed throughout a system but that has not yet been reassembled. When a request to assemble or recreate (also known as "rehydrate") an item (e.g., file, object) is received, the shards of the Bloom filter that are associated with the k/v nodes from which the chunks will be retrieved may be consulted to identify parts that individually may be harmless but that when re-assembled into their whole from their individually innocuous parts may be malicious.

Looking for a certain file or certain type of file (e.g., virus) may be one specific example of a system that is data aware. Conventionally, a "signature" for an entire virus may be checked. The signature may be, for example, a hash of the entire file. In a deduplicating object store, the entire file may not be stored as a single entity, which may make searching for viruses using conventional virus signatures ineffective.

In conventional systems that provide some data awareness, the awareness may be provided by a separate application that is run from a separate (e.g., central) location that has visibility into an entire file system. This type of data awareness may be provided in, for example, a NAS architecture. However, this data awareness may actually be just "metadata awareness". Metadata awareness may provide insights such as "a user has 17 files and the user's last touch of any of those files was at yyyy:mm:dd:hh:mm:ss." A conventional application may harvest metadata and telemetry and reflect it back to the user. The storage devices in the NAS may monitor and report back to the central application metrics and insights into the data they are storing and their own performance. These metrics and insights are tied to where the attributes are located, not the data itself.

Example data aware deduplicating object stores that use consistent hashing with variable length deduplication and shared nothing access in a dual ring architecture may provide improved data awareness over conventional systems. The data awareness may be actual data awareness as opposed to simply metadata awareness. Actual data awareness may include, for example, content awareness.

In one example architecture, the data awareness is built into the architecture rather than being added on by a separate application. The data awareness may be built in at a top layer (e.g., presentation), at a lower layer (e.g., k/v nodes), or at a combination of layers. In one embodiment, data awareness work can be distributed to k/v nodes along with the data upon which the data awareness work is to be performed. Since k/v nodes may store both data and work to be performed on that data, data awareness may proceed in parallel at the k/v nodes. Additionally, since data awareness work may be performed at the k/v node, the work may be able to access the contents of an item, rather than just metadata about the item.

Since data awareness may be performed at different locations by different processes, rather than just at a single central location, data awareness data (DAD) may be acquired at times including ingest, rehydration, protection time, or other times. Protection time refers to the time at which data is protected by, for example, generating erasure codes, replicating data, populating a RAID, or other data protection actions. In addition to data awareness work being performed in parallel at various k/v nodes, metadata awareness may also be performed simultaneously on the metadata ring.

Unlike a conventional system that has a single central actor that performs or assigns all work and that collects all results, example apparatus and methods facilitate accessing the DAD from various locations in the dual ring architecture.

Since data awareness may be performed at different levels and by different actors, DAD other than just metadata awareness data (MAD) may be produced. For example, DAD may be collected that describes the usage of a container or system itself, including how full the container or system is, who is using the container or system, or what input/output operations (iops) are associated with the container or system. The DAD may also describe what the content being ingested, stored, or rehydrated by the system is. The DAD may also describe what the content stores, where the content includes interesting (e.g. actual file) or suspect (e.g., virus) things. The DAD may also describe who is accessing the content, from where the content is being accessed, when the content is being accessed, or how often the content is being accessed.

Since processing may be performed at the k/v node level, in one dual ring architecture, the k/v nodes can gather, generate, or otherwise process data on-the-fly. Example embodiments may then also store that data on a separate searchable device or data structure, including, for example, a database.

Example embodiments may employ indirect pattern recognition of content. Hashes or signatures of chunks stored in a data aware deduplicating object store may be used for purposes other than just determining whether a chunk is present. For example, a hash based signature of less than an entire item may be used for indirect pattern recognition of content. This is one example of "content based searching." One type of content based searching is looking for viruses.

Hash based signatures of less than an entire item (e.g., 1 chunk, 2 or more chunks) can provide information about whether the larger whole, or some other interesting thing, might be present in a system. Different data structures (e.g., Bloom filters) can be constructed that identify "interesting" wholes (e.g., viruses). The data structures can be consulted at different times to determine whether pieces that are members of an interesting whole are present. The data structures may be consulted at times including, when an item (e.g., file, object) is restored from a repository, when an item is ingested into a repository, when a threshold number of chunks have been encountered by a repository, or at other times.

Example embodiments may determine if a threshold number of chunks that are needed to complete the interesting whole item are present. If a threshold number of chunks that are needed to complete the interesting whole item are present, then a threat level for the presence of the "whole" may be manipulated and action may be taken to anticipate or handle the whole. For example, a virus may be quarantined.

In one embodiment, if the "signature" (e.g., ordered set of hashes) of a virus is known, then constituent chunks can be looked for during processing. Before the entire ordered set is encountered, if a threshold amount of the set is encountered then proactive actions may be taken. In one embodiment, various "signatures" for suspected items can be registered in a Bloom filter(s). The Bloom filter(s) may be stored in locations including a metadata ring or a presentation layer. The Bloom filter(s) may be sharded to the k/v stores in the bulk ring.

To support content based searching that facilitates indirect pattern recognition of content, ingest may include producing tags about where a chunk came from. A tag may be, for example, a doubly linked list, or other data structure. This may facilitate identifying a source for malicious content.

When items are being restored from chunks in the repository, iops may be saved by aborting searches for chunks and reads of chunks that are associated with an item for which a threshold amount of a virus signature has been encountered. For example, if a recipe or its set of hashes has reached a "suspect" level, then restoration or recreation of that item may be aborted. This improves the efficiency of the computing system and data storage system by saving iops that would be spent on retrieving items that would later be discarded or quarantined. This also improves the efficiency of the computing system and data storage system because higher level (e.g., item level virus signature) checking does not have to be performed on a full recreated item. No fully recreated item is produced when the incomplete subset of chunks triggered cessation of the recreation due to content based searching. Virus checking does not need to be performed on an item that has been discarded after only partial retrieval. Reducing the number of iops that are needed for a given task may reduce the energy requirements of a system, and thus provides a concrete, measurable improvement over conventional approaches.

Conventional systems may examine the plaintext of an entire file to determine whether the file is a virus. However, this requires the plaintext of the entire file to be assembled and available. Assembling the plaintext of the entire file may provide an opportunity for the file to engage in malicious behavior. Example apparatus and methods do not need to examine the plaintext of an entire file. Instead, a collection of hashes produced by a set of chunks associated with the entire file may be examined. Examining chunks before they are assembled may remove the opportunity that exists in conventional systems that require an examination of the completely assembled plaintext. Example embodiments thus improve on conventional approaches.

Example embodiments facilitate implementing a hierarchy of protection. A data aware deduplicating object store architecture may be protected in different ways at different levels. Providing the different protection at different levels or layers may increase efficiency over conventional systems. The levels or layers may include a presentation level, an ingest level, a distribution level, a metadata level, and a bulk data level.

In a conventional deduplication system, erasure coding may be performed at ingest before items have been deduplicated. This approach may involve processing and distributing data that may end up not being stored because it is duplicate data. This is inefficient. Producing erasure codes for data that does not get stored is a waste of processing cycles, memory, and electricity.

In a conventional deduplication system, erasure coding may be performed for data that may never experience a failure. Once again, this is inefficient. Producing erasure codes for data that remains intact for its entire life is a waste of processing cycles, memory, and electricity.

Consider that the most common failure domain for a data storage architecture that employs multiple devices in multiple nodes is a single device becoming unavailable in a single node. This type of failure could be protected against by performing erasure coding at the device or at the node. While perfect knowledge about which device is likely to fail would produce optimal behavior, imperfect knowledge about the likelihood that a device will fail and the impact that failure will have can control a data protection scheme to operate more efficiently.

Example apparatus and methods employ a hierarchy of protection that solves different problems in appropriate ways at the appropriate time and level. The different problems may range, for example, from an individual device (e.g., disk) failure to a site disaster where multiple devices are damaged or destroyed. The different approaches to addressing the problems may include, for example, replicating data, performing erasure coding, or other protection schemes.

Providing a hierarchy of protection facilitates providing clients with a service level agreement (SLA) for the type and amount of protection that is performed at various levels and at various nodes.

In one embodiment, protection via replication may be performed at a higher level (e.g., metadata ring, presentation layer) in the architecture and protection via erasure coding may be performed at a lower level (e.g., on k/v node, in conditioned storage) in the architecture. In this embodiment, the replication is suitable for disaster recovery (DR) or business continuation (BC). The erasure coding is suitable for data protection and rebuild in real-time, non DR/BC cases. Replication may involve less processing than erasure coding. In some situations, it may be desirable to replicate more data and to erasure code less data. Therefore, erasure coding may be deferred until after deduplication has been performed, with overall protection provided during deduplication by the replication.

Since individual k/v nodes are used to implement the bulk ring, one embodiment allows individual k/v nodes to determine how to protect their own data. However, in one embodiment, the individual k/v nodes may be constrained to use protection schemes that support an overall protection scheme. Performing erasure coding at the k/v node level provides localized protection so that a protection level with the desired number of nines at a node can be selected by the user or owner of the node. Different erasure coding schemes may be appropriate for different k/v nodes based, for example, on statistics about the hardware at the k/v node. For example, a near capacity node experiencing intermittent failures may warrant more rigorous erasure coding than a lightly loaded node experiencing no failures. Despite individual k/v nodes being allowed some autonomy in their protection scheme, individual nodes that are individually visible may still be federated to allow reconstruction.

Example embodiments facilitate the implementation of a scale out object store. When an architecture includes multiple physical devices, the devices have to be physically located in actual places. The physical devices need to be connected or "plugged in" to an infrastructure that provides electricity and connectivity. Positioning (e.g., plugging in, connecting, rack mounting) a physical device involves a physical action that is most likely performed by a human. Humans are fallible, and may therefore be slow or unreliable.

When a large number of devices (e.g., disks) are involved, a large number of racks may be required to house the disks. When multiple disks and multiple racks are involved, one or more disks may end up in an incorrect location due to human error. It may be difficult and time consuming to determine where a disk is actually located and where that disk is supposed to be located. The locations may be physical (e.g., rack) or may be logical (e.g., metadata ring, bulk ring).

Example apparatus and methods facilitate placing devices (e.g., disks) in locations (e.g., racks) in a way that is impervious to installer error. Example apparatus and methods facilitate determining where a disk belongs in a ring when it is arbitrarily placed in a rack or collection of racks.

Disks may be connected or plugged into a first location in a first rack at a first time and then may arbitrarily be removed and connected or plugged into a second, different location in the same rack or a different rack at a second time. Example apparatus and methods provide an automated discovery process that facilitates automatically assembling a ring when its nodes get plugged in or connected. Example apparatus and methods also provide an automated discovery process that facilitates automatically reassembling a ring when nodes associated with the ring are repositioned or otherwise moved.

In one embodiment, a k/v node may perform a self-discovery process that identifies the range of hash values that it is supposed to store and accept.

Example apparatus may perform a combined top-down and bottom-up approach. The bottom up approach facilitates logical k/v nodes to be able to come up no matter where actual storage devices that implement the logical k/v nodes are located. This bottom up approach is supported by k/v nodes that are self-aware and self-identifying. Being self-aware means that a k/v node knows its own name and the range of hashes with which it is associated. Being self-identifying means that a k/v node is able to broadcast or provide its name and hash range to another device or process.

The top down approach is based on the overall system knowing k/v node names and associated hash ranges. The top down approach does not use IP addresses to identify k/v nodes. Instead, a cluster map that maps a k/v node to a physical location is employed. The bottom-up approach and the top-down approach can "meet in the middle" through the use of "bi-directional bread crumbs."

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Like numbers refer to like or similar elements throughout the description of the figures. When an element is referred to as being "connected" to another element, it can be directly connected to the other element or intervening elements may be present. In contrast, when an element is referred to as being "directly connected" to another element, there are no intervening elements present. Other words used to describe the relationship between elements should be interpreted in a like fashion (e.g., "between" versus "directly between," "adjacent" versus "directly adjacent," etc.).

FIG. 1 illustrates an approach to consistent hashing for a first data 110. Data 110 that is received may be chunked and then hashed into a set of hashes 120. The set of hashes 120 are used to direct a chunk to a k/v node in a collection of k/v nodes 140 that implement a consistent hashing ring. Index shards may be maintained on individual k/v nodes. In figure one, the set of hashes 120 has been represented as individual hashes 130 h1, h2, h3, h4, and h5 that are produced for five chunks that are present in the first data 110 presented to the system.

A data aware deduplicating object storage (DADOS) architecture may be a "shared nothing" approach where cache, data, and metadata are stored in repositories in a deterministic fashion. Visibility to those locations is limited to interfaces. Converting data to chunks facilitates direct retrieval, deduplication, load balancing, autonomic space management, and other actions.

Figure 2:
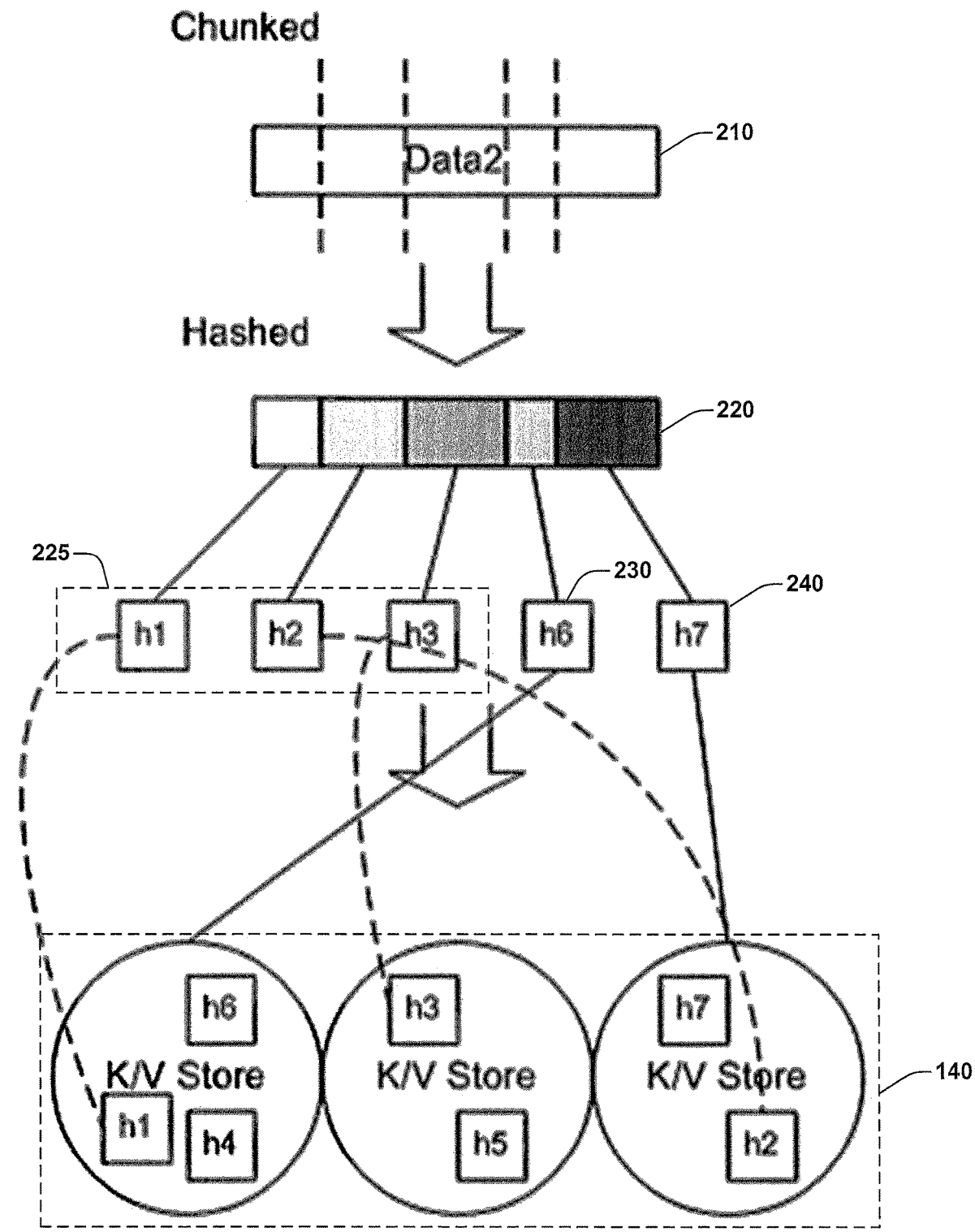
FIG. 2 illustrates an approach to consistent hashing for a second data.

FIG. 2 illustrates next data 210 (e.g. Data2) hashed into a set of hashes 220. In FIG. 2, hashes h6 230 and h7 240 are produced for chunks that are present in the next data 210 that is presented to the system but that were not seen in the first data 110 presented to the system in FIG. 1. Once again, a subset of hashes 225, as well as hash h6 230, and hash h7 240 are used to direct the chunks to specific k/v nodes in the collection of k/v nodes 140 that is part of a bulk ring.

Figure 3:
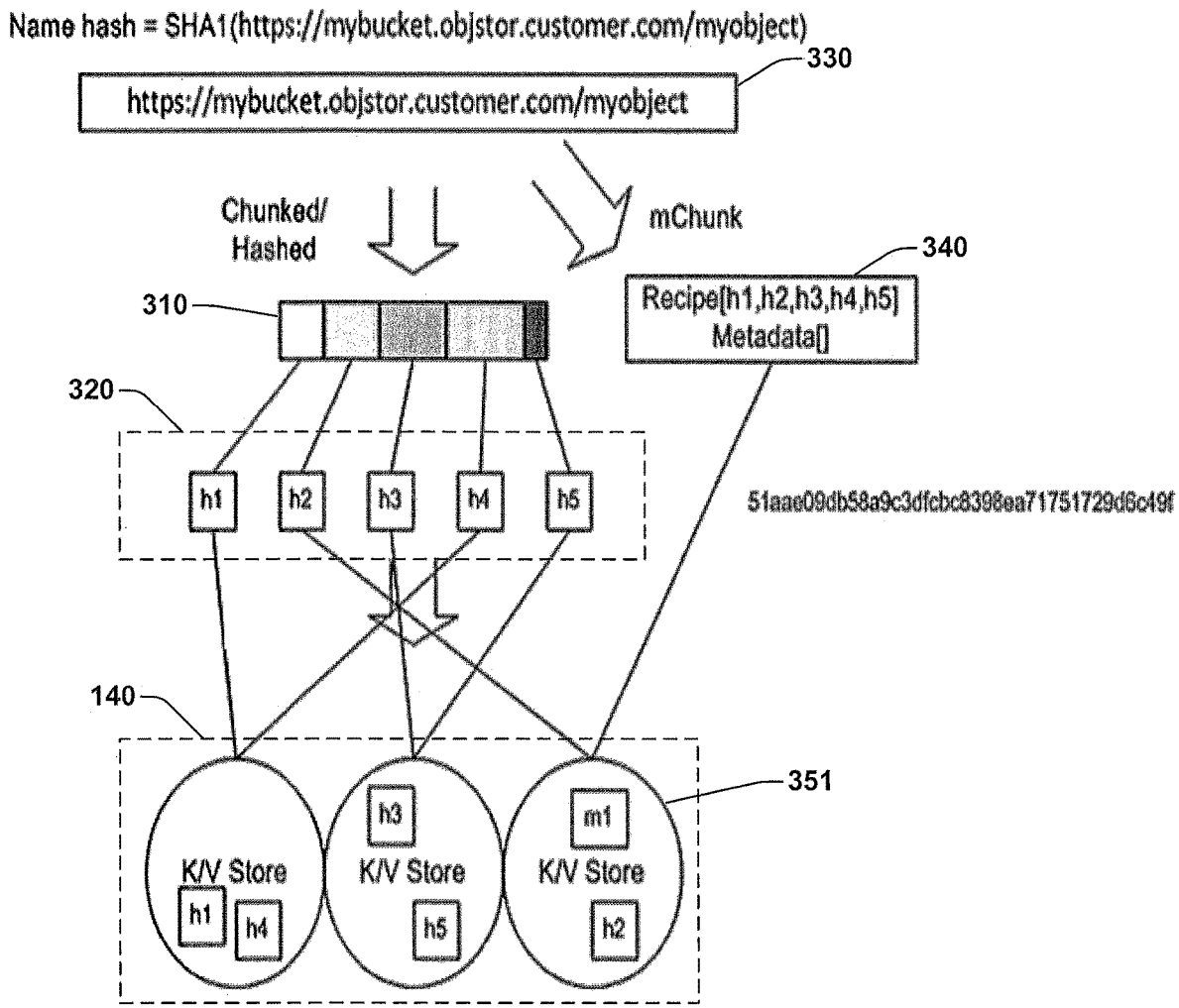
FIG. 3 illustrates a hash of a filename being used to position a first recipe of the first data.

Information about the data that has been presented to the system is stored in a metadata data store. FIG. 3 illustrates a hash of a file name 330 being used to position a recipe 340 of the file that includes the chunks 310 that produced the set of hashes 320 h1 . . . h5. FIG. 3 shows the metadata being stored on a k/v node 351 that is also storing chunks. K/v node 351 is a member of a collection of k/v nodes 140. FIG. 3 thus illustrates an example of a single ring architecture. In a dual ring architecture, the metadata may be stored on a separate node that does not store any chunks.

Figure 4:
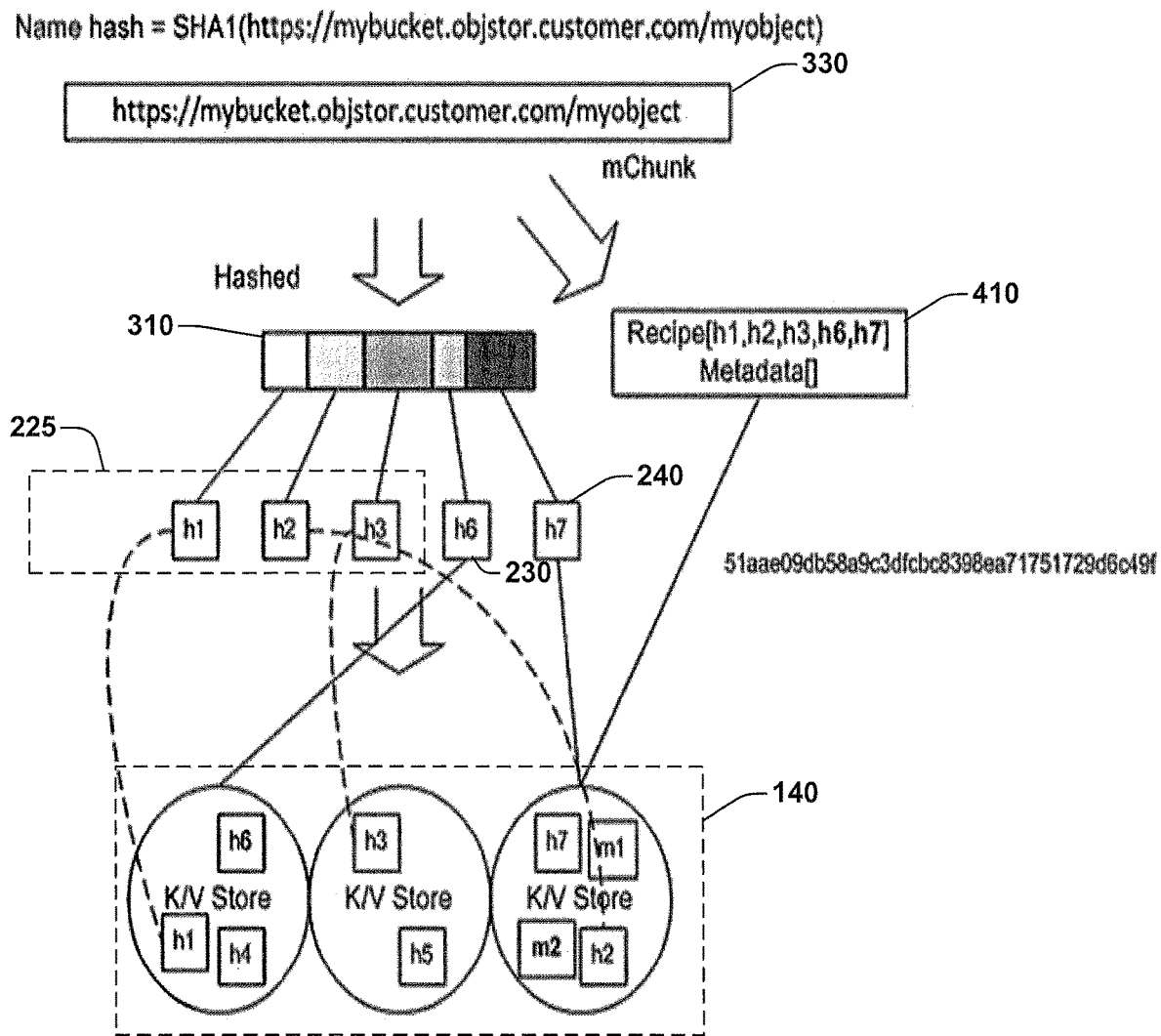
FIG. 4 illustrates a second recipe being stored for the second data.

FIG. 4 illustrates a second recipe being stored for the second data. FIG. 4 shows a second recipe 410 being stored for the second piece of data 210 illustrated in FIG. 2 (Data2) that included chunks associated with hashes 225 h1, h2, h3, hash 230 h6, and hash 240 h7. This recipe 410 and metadata is stored on the same k/v node 140 as the first recipe and metadata in a single ring architecture.

Figure 5:
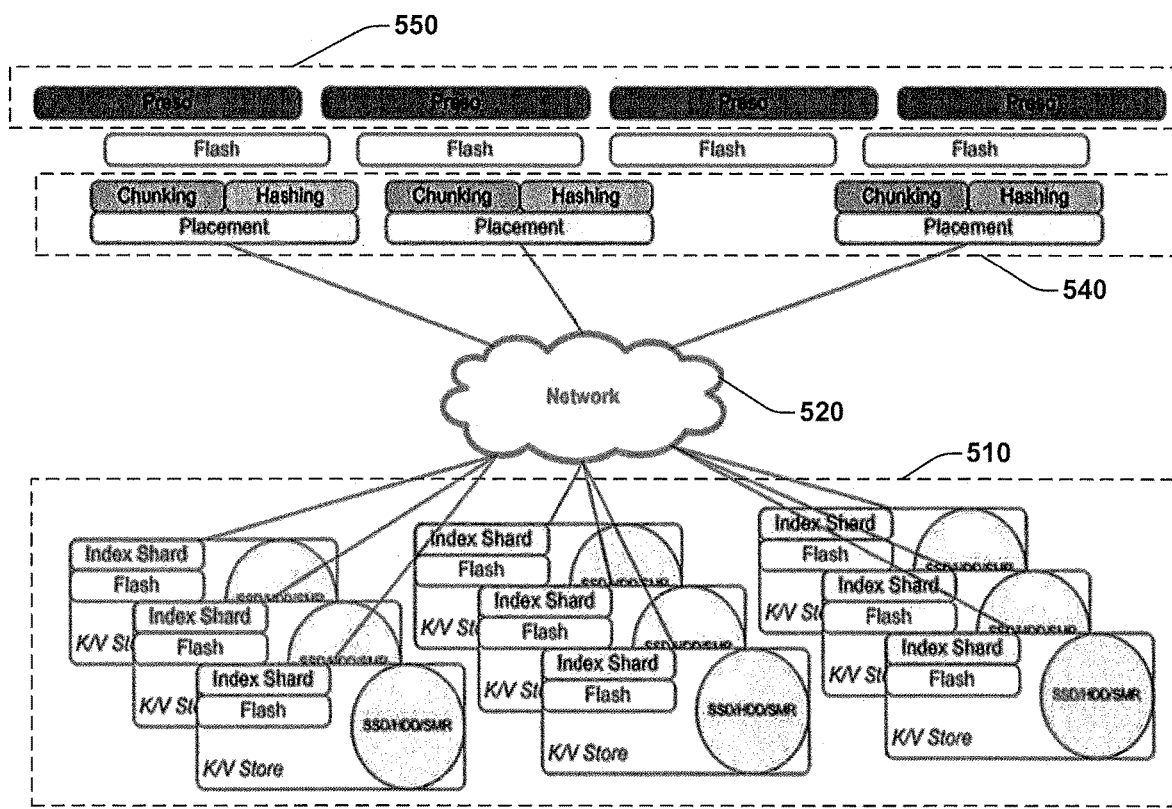
FIG. 5 illustrates an example of a scaled out architecture.

Since k/v nodes are used to implement the consistent hash ring(s), example embodiments simplify scaling up the data storage architecture. FIG. 5 illustrates one example scaled out architecture. The k/v nodes 510 (or k/v stores) are shown having an index shard stored in flash memory and chunks stored on a solid state drive (SSD), hard disk drive (HDD), or shingled magnetic recording (SMR). This illustrates that nodes may include a combination of devices. While the nodes in FIG. 5 are all the same storage type (e.g. flash), different nodes may have different combinations of storage devices. The k/v nodes 510 are accessible across a network 520 to various deduplication processes 540 that perform chunking, hashing, and placement. These processes may in turn be visible through a presentation (preso) layer 550.

Figure 6:
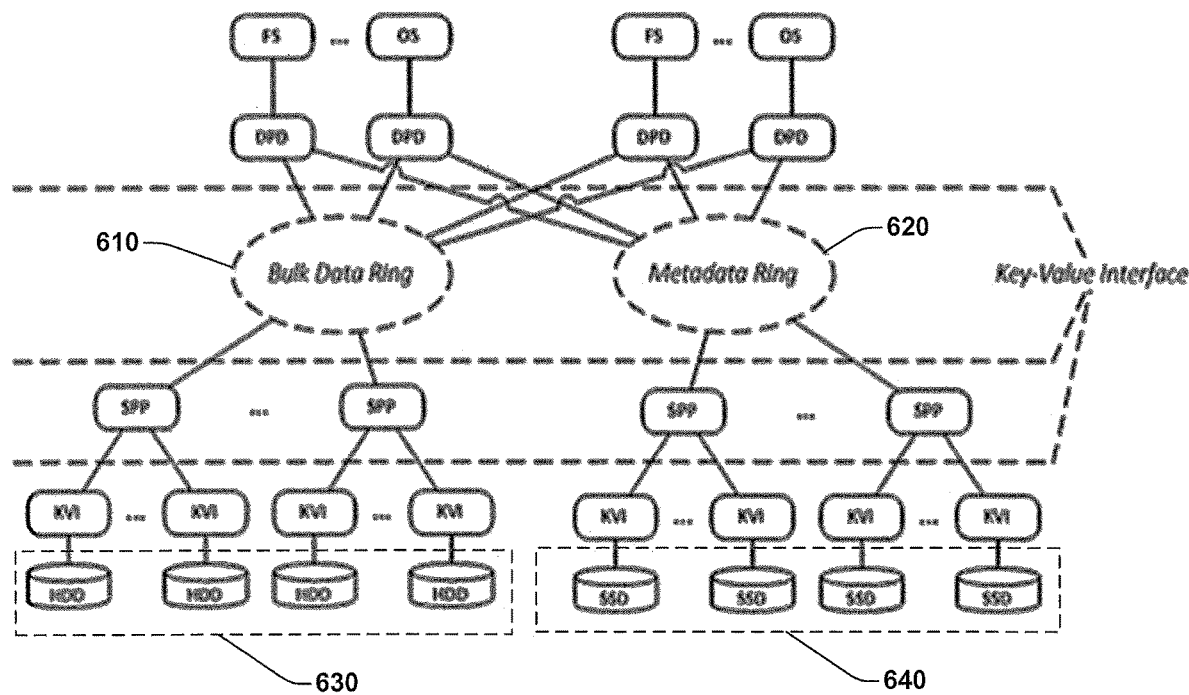
FIG. 6 illustrates an example of a dual ring architecture.

FIG. 6 illustrates one example dual ring architecture. The example dual ring architecture includes both a bulk data ring 610 and a metadata ring 620. Chunks may be stored on the bulk data ring 610 and metadata may be stored on the metadata ring 620. In FIG. 6, FS represents a file system, OS represents an object store, DPD represents data placement/deduplication, SPP represents storage protection/packaging, and KVI represents a key/value interface. FIG. 6 illustrates one embodiment in which bulk data ring 610 includes a plurality of hard disks 630, while metadata ring 620 includes a plurality of solid state devices 640.

Figure 7:
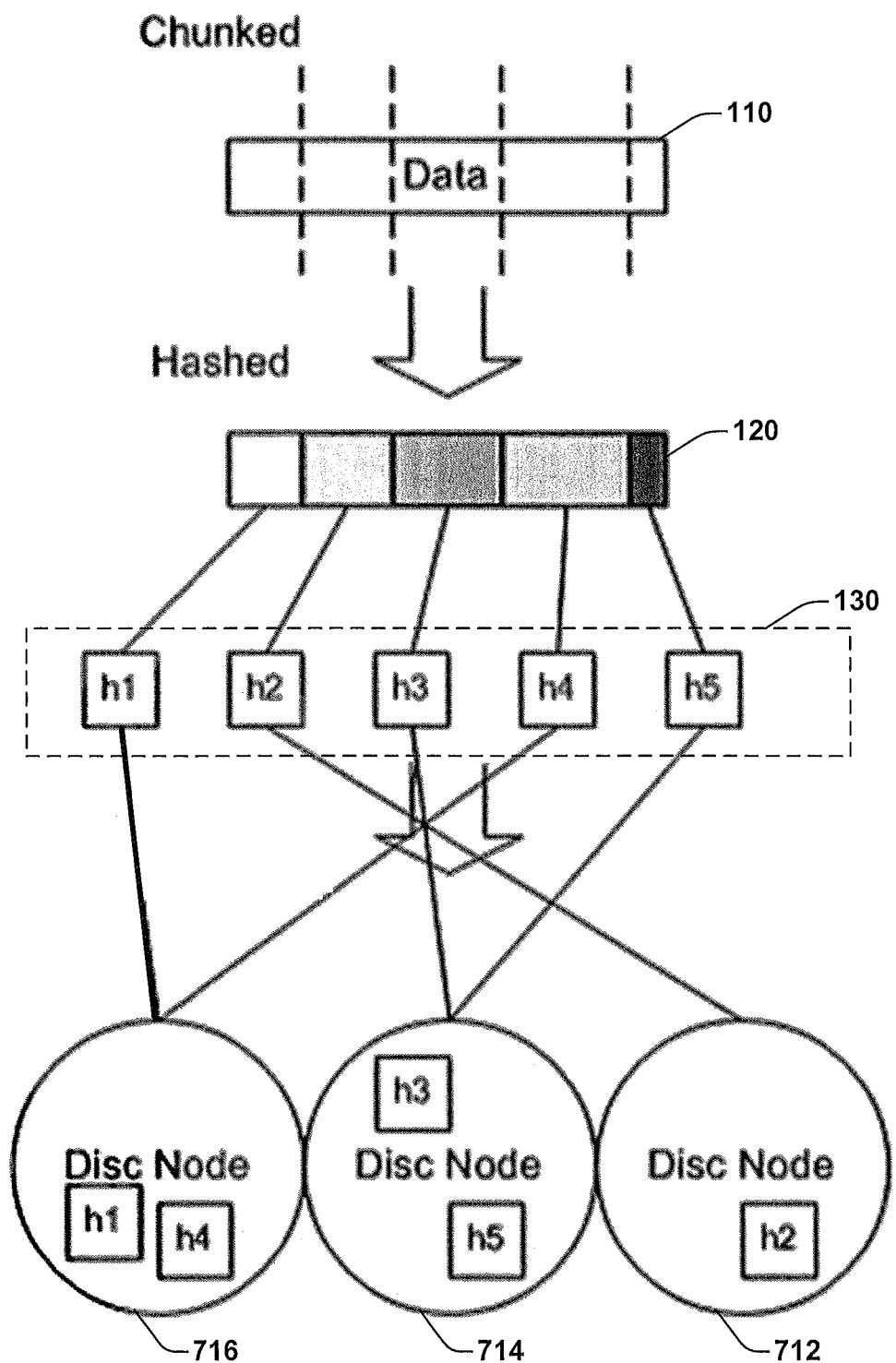
FIG. 7 illustrates an approach to consistent hashing.

FIG. 7 illustrates one embodiment of an approach to consistent hashing. A shard is based on a uniformly distributed hash of data (e.g., SHA-1). In this embodiment, distribution is deterministic, in that data placement is directed to individual disks. Data may also be spread among nodes if the system is operating in a multiple disks/node mode. Data placement may also be hierarchical. In this embodiment, a disc node (e.g. disc node 712, 714, or 716) maintains a local shard of an index. The disc node may also maintain hashes, locations of chunks on disk using logical block addressing (LBA), or a length of the data. Thus, the disc node maintains a self-contained mapping index from the data hash to the internal location of the data. A disc node may comprise disk based storage and flash storage, where the flash storage is used for fast index lookup. Example embodiments may be all network-based, including remote direct memory access (RDMA) or Ethernet approaches. Discs are object stores and may employ a representational state transfer (ReST) API, including put or get function. Data and metadata are also shard protected on disk, where the metadata ring or the data ring protect metadata or data stored on the metadata ring or the data ring respectively.

In one embodiment, the fully-scalable, shared-nothing architecture uses a "disk as disk" approach but with data protection added at an upper tier, a disk tier, or combination of tiers. Conceptually, the protection is replication-based, where all data is sent to a target from a source. No content is kept on the source long-term. Some content may be cached. In one embodiment, unique content is sent to the data stores and duplicate content is not sent. Data chunking and hashing is performed on the clients, while deduplication is performed on the target nodes (e.g., k/v nodes). The deduplication may be performed at the individual disk level. In this embodiment, disks are object stores that happen to support global deduplication at a particular scale or distance. Deterministic data placement is applied to both data and metadata, which enables shared access. Flash memory may be used for caching.

In one embodiment, nodes can be physical or virtual. In one embodiment, an architecture may run DiscNodes in the Cloud (e.g., EC2 instances) with disks including S3 cloud storage. The access nodes and disc nodes can be on one appliance or the architecture can separate access nodes from disc nodes. This embodiment does not need to have a global or unified file system space(s), but may still support a global storage space.

Example embodiments may support a unified presentation layer(s). The presentation layer is decoupled from the global storage pool. Metadata sharding enables global, shared access. Flash may be used for faster ingest performance on Access nodes. Flash may be used as cache on Access nodes to tolerate higher latency Disc nodes because disc nodes could be across a WAN. Flash may be used in post-processing to eliminate performance penalties associated with spinning disk I/O.

In one embodiment, disc nodes are autonomic or independent. The disc nodes may manage their own storage. The disc nodes may be heterogeneous. Disc nodes may use a ReST API. Garbage collection may be performed individually by a disc node based, for example, on a reference count or need. The architecture may scale out by adding disc nodes independent of access nodes. A failed disc node may be rebuilt in different ways. In one embodiment, a failed disk may be rebuilt as a function performed at an access node layer that pushes work out to disc nodes.

In one embodiment, a front-end presentation layer or protocol is independent of the back-end that implements the rings (e.g. metadata ring, bulk ring). Devices including S3, NAS, VTL, FTP, or other devices are viable at the back end. Thus, a front end protocol used to add or access data may be independent of a back end protocol used to store data to physical media.

One embodiment may provide a high availability (HA) configuration. The HA configuration provides HA among a pair or cluster of access nodes. Provision of the HA is decoupled from other elements of the architecture so it can be added, withdrawn, or updated independently of other elements of the architecture.

In one embodiment, the data aware deduplicating data store is a platform-independent data storage architecture. In one embodiment, there may be no architectural limits because of the scale out with full shared access (e.g. S3, NAS) architecture. This may facilitate storing, for example, high volumes of data, (e.g. 100 TB-100 PB) and up to 10 billion objects. In one embodiment, the data aware deduplicating data store will not include any RAID elements. In another embodiment, the data aware deduplicating data store includes RAID elements.

Figure 8:
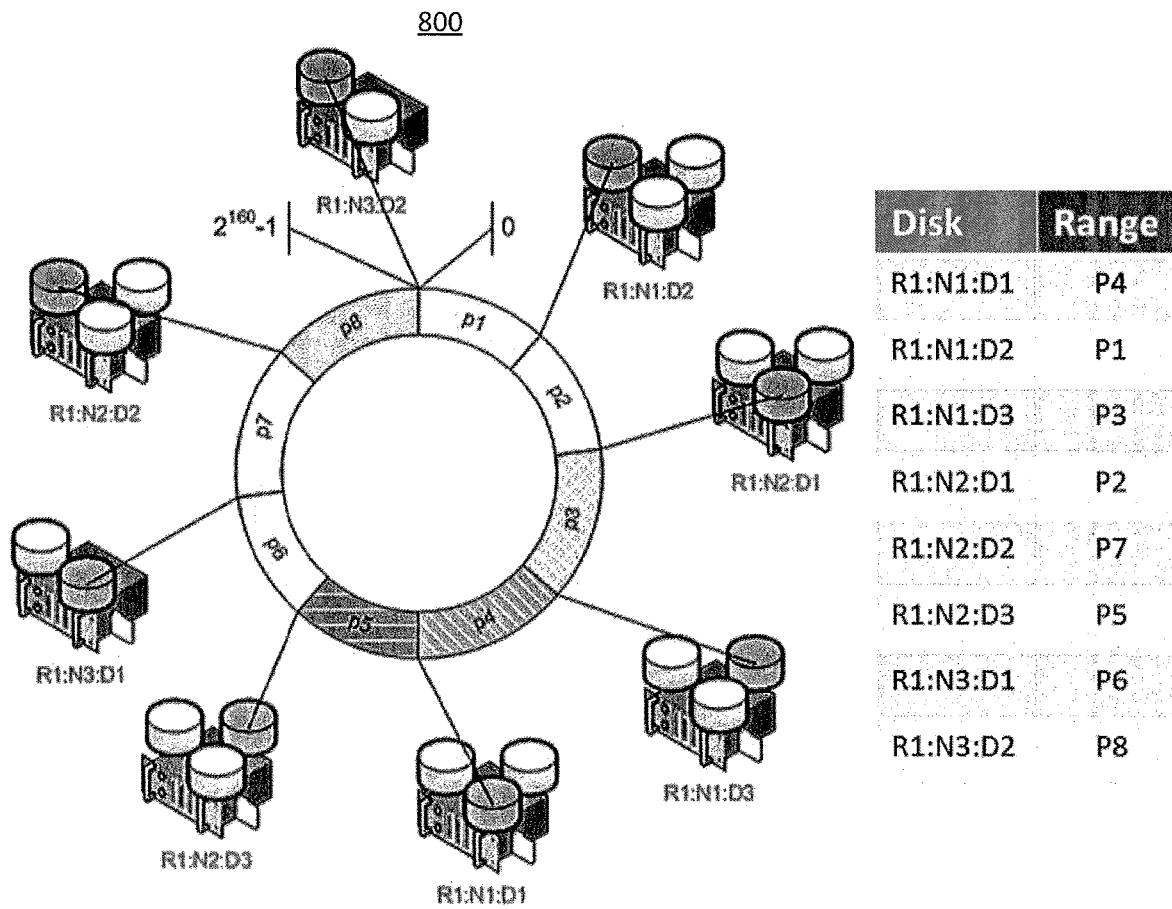
FIG. 8 illustrates a simplified disk map of a ring implemented for a consistent hashing approach.

Example embodiments may employ consistent hashing for storing bulk data (e.g. chunks), metadata, caches, dispatching work, and for load balancing. FIG. 8 illustrates one simplified disk map of a ring 800 implemented for a consistent hashing approach. Ring 800 may include a plurality of disks (e.g. R1:N1:D1 . . . R1:N3:D2) associated with a plurality of ranges (e.g. p1 . . . p8). As illustrated with respect to ring 800, R1 represents "rack 1", R2 represents "rack 2", R3 represents "rack 3", N1 represents "node 1", N2 represents "node 2", N3 represents "node 3", D1 represents "disk 1", D2 represents "disk 2", and D3 represents "disk 3". Example embodiments map a "bucket" to many ranges, or may employ many small logical buckets. In one embodiment, a hash is divided into a plurality of buckets. The number of buckets is larger than the number of storage nodes. A storage node is configured to store multiple buckets from the plurality of buckets. Storing multiple buckets on a node reduces the amount of data that needs to be moved when a new node is added to the ring of nodes. Instead of all the contents of a node needing to be moved when a new node is added to the ring, only a subset of the data on a node is relocated when the associated bucket is assigned to the new node. Data may be relocated subject to a node-skipping protocol.

Node skipping involves placing redundant information on distinct devices. Redundant information may include redundant copies, more than one RAID stripe, or multiple erasure code words of a single datum. Placing data and its redundancy (e.g. associated erasure codes) on a single device puts the data and its redundancy at risk if the single device fails.

Example embodiments facilitate greater protection of data than conventional approaches by protecting data across multiple nodes in a ring.

Figure 9:
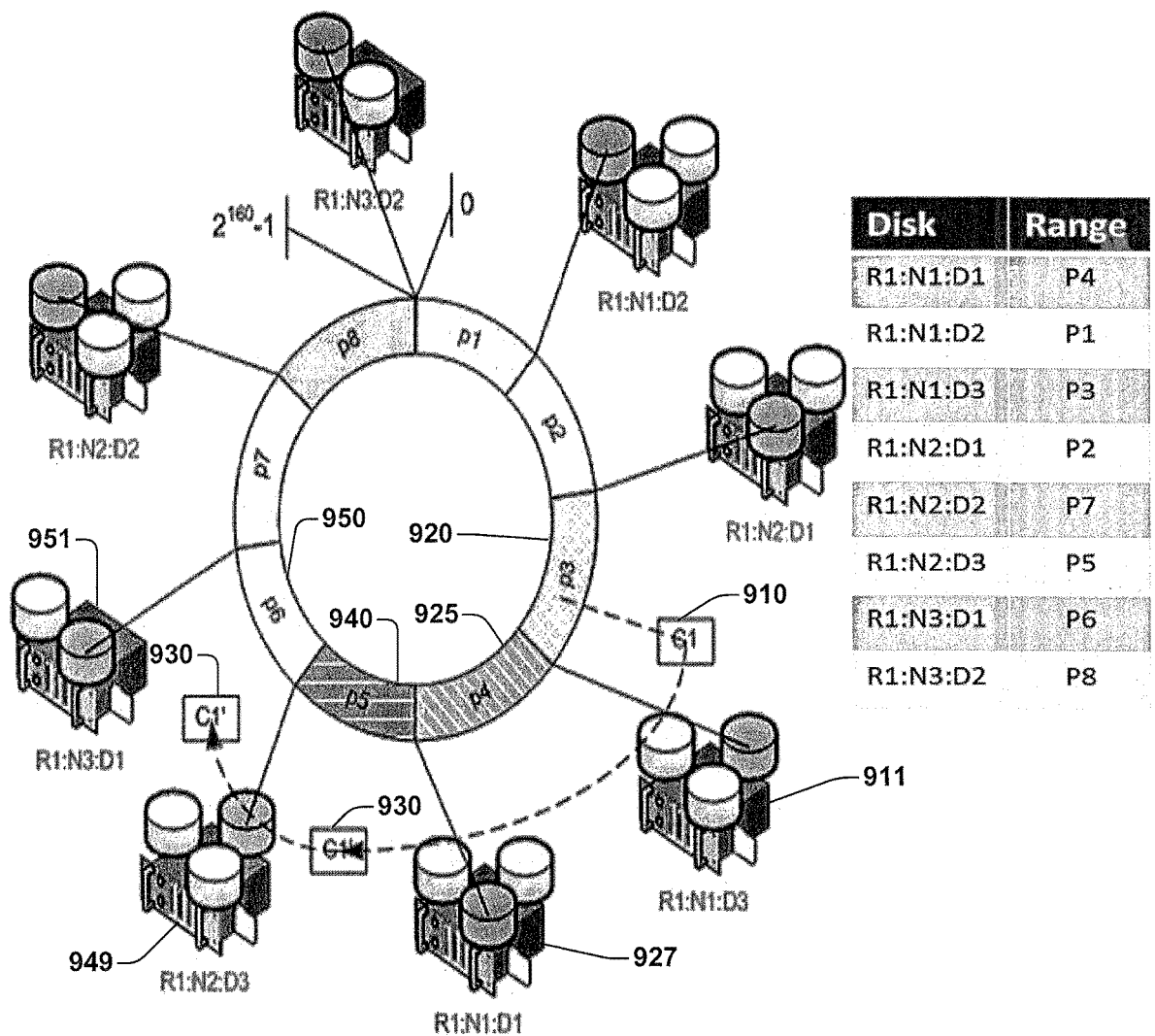
FIG. 9 illustrates an approach to data protection with a node skipping protocol.

FIG. 9 illustrates an approach to data protection with a node skipping protocol. FIG. 9 illustrates data protection in ring 800 with a node skipping protocol in which content may be protected by placing it on more than one node. In FIG. 9, a chunk C1 910 is initially stored in range p3 920 associated with node 1 in R1:N1:D3 911. A chunk C1' 930 is also stored in range p5 940, associated with node 2 in R1:N2:D3 949, skipping over range p4 925 that is also associated with node 1: R1:N1:D1 927. In this example, chunk C1' 930 may also be stored in range p6 950 associated with node 3 R1:N3:D1 951. Thus, in the embodiment illustrated in FIG. 9, a chunk C1 910 stored in a first node (node 1 in R1:N1:D3) is protected by storing chunk C1' 930 in a second, different node (node 2 in R1:N2:D3 949) as well as in a third, different node (node 3 in R1:N3:D1 951), skipping over R1:N1:D1 927.

Figure 10:
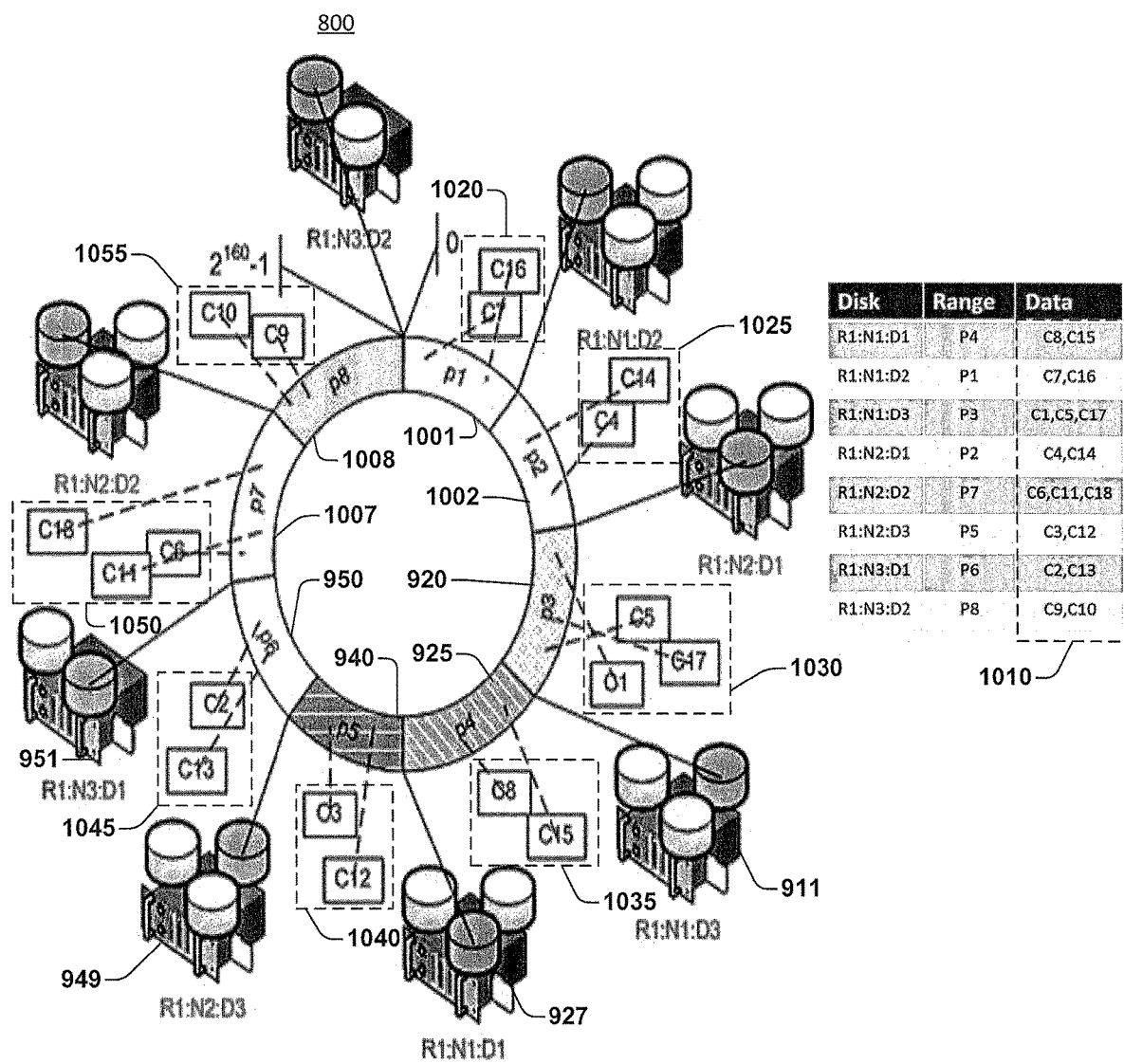
FIG. 10 illustrates data being added to a ring implemented for a consistent hashing approach.

FIG. 10 illustrates data 1010 being added to ring 800 implemented for a consistent hashing approach. The data 1010 includes a plurality of chunks C1 . . . C18. As illustrated in FIG. 10, chunks 1020 are added to range p1 1001. Chunks 1025 are added to range p2 1002. Chunks 1030 are added to range p3 920. Chunks 1035 are added to range p4 925. Chunks 1040 are added to range p5 940. Chunks 1045 are added to range p6 950. Chunks 1050 are added to range p7 1007. Chunks 1055 are added to range p8 1008.

Figure 11:
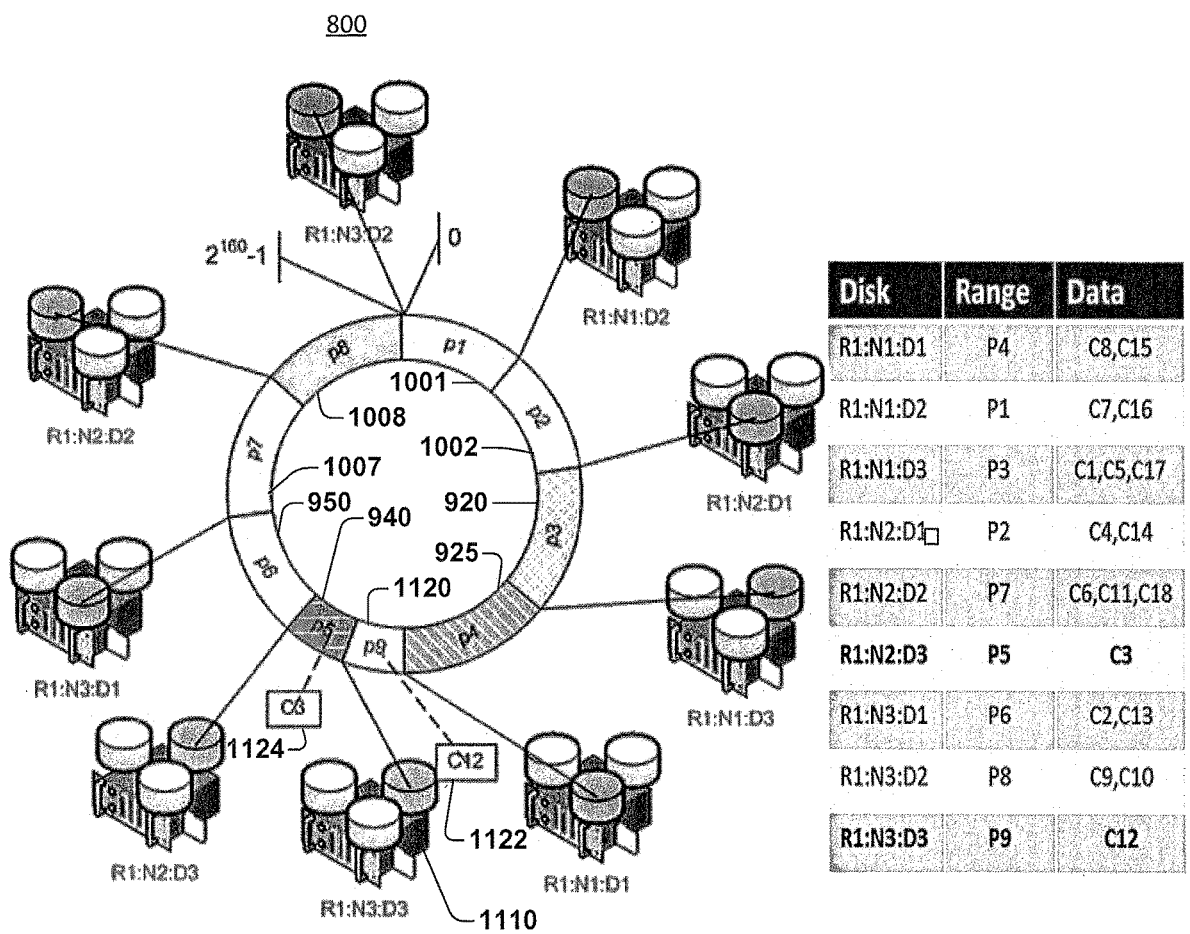
FIG. 11 illustrates capacity being added to a ring implemented for a consistent hashing approach.

FIG. 11 illustrates capacity being added to the ring 800. For clarity, not all the data chunks illustrated in FIG. 10 are illustrated in FIG. 11. In FIG. 11, device R1:N3:D3 1110 associated with node 3 is added to ring 800. Device R1:N3:D3 1110 may be, for example, a disk drive, a tape drive, or other storage device or devices. Range p9 1120 is also added, corresponding to device R1:N3:D3 1110. In one embodiment, range p9 1120 is created by dividing range p5 940. Portions of objects may be migrated from a first range to a second, different range. For example, chunk C12 1122 is migrated to range p9 1120, while chunk C3 1124 remains in range p5 940. By employing multiple logical buckets, a new bucket (e.g. range p9 1120) may take a share of data from several other buckets.

Figure 12:
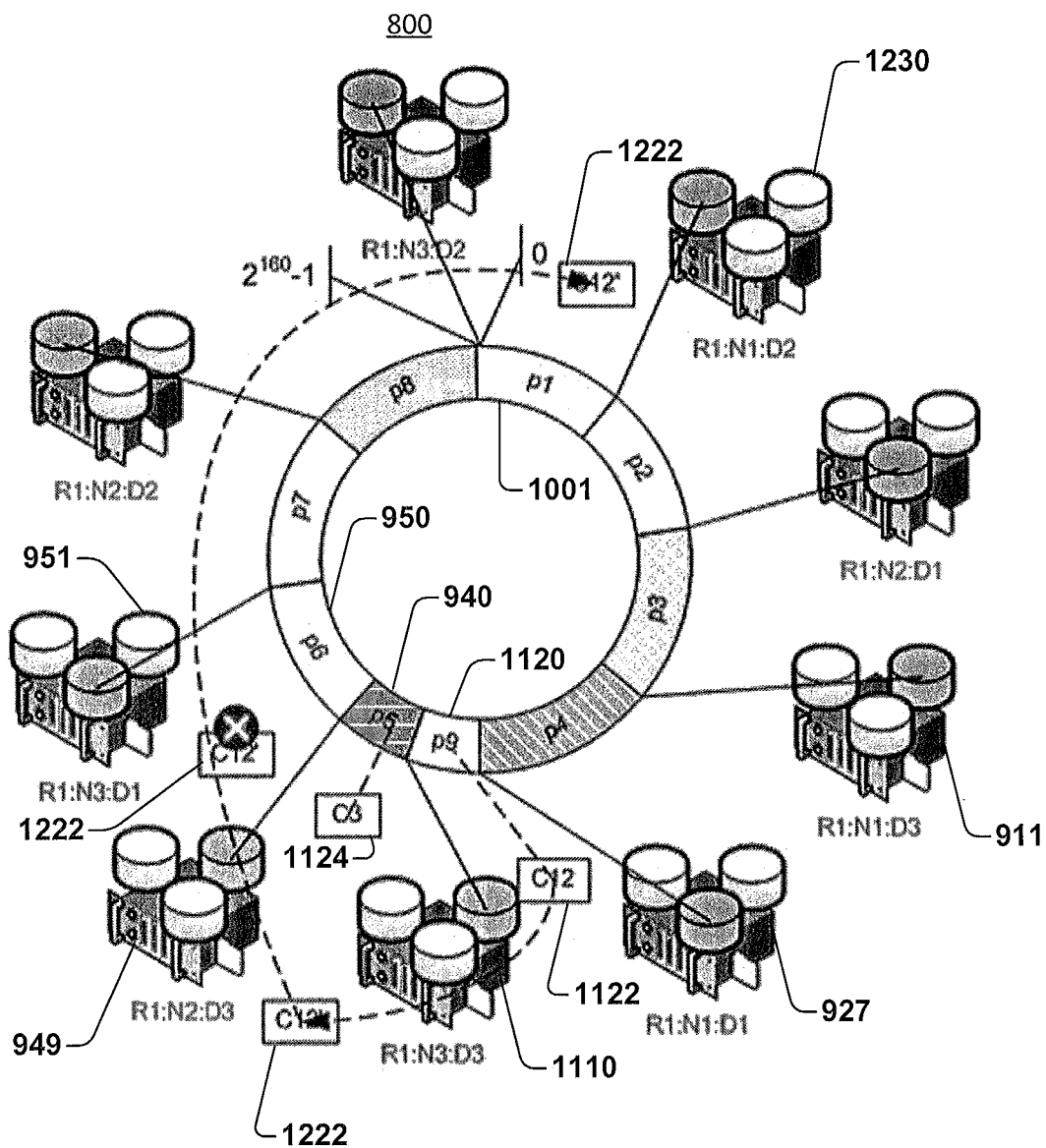
FIG. 12 illustrates capacity being added to a ring implemented for a consistent hashing approach with node skipping protection.

FIG. 12 illustrates capacity being added to ring 800 with node skipping protection. As illustrated in FIG. 12, protection scopes are rebalanced as well, honoring hierarchy rules that may be employed by a data storage system. As described with respect to FIG. 11, device R1:N3:D3 1110 takes over storage of the primary copy of chunk C12 1122. In this embodiment, a chunk C12' 1222 that initially had been placed in range p6 950 associated with R1:N3:D1 951 must be moved to keep the system in compliance with node skipping protection, otherwise chunk C12' 1222 would be stored on two node 3 devices. Recall that in a node-skipping protocol, data and its redundancy is not stored in the same node. Thus, chunk C12' 1222 is node-skipped around the ring 800 until it encounters a node that it is not already stored on, in this example to range p1 1001 associated with R1:N1:D2 1230, placing it in a hardware independent location.

Example embodiments described herein facilitate the operation of a self managing storage device. The self managing storage device may be a data aware deduplicating object store. Conventionally, storage devices do not manage their own capacity space. Instead, storage devices (e.g., disk drives) are organized by file systems, which track block allocations organized as files. As files are deleted and blocks are freed, only the file system is aware of what has happened. The storage device has no self-awareness of which blocks have been freed. Thus, a conventional storage device is not able to act on its own to reclaim freed blocks.

The performance of some storage devices (e.g., flash, shingled magnetic recording (SMR) disk) may be negatively affected by the presence of unused blocks. Example embodiments facilitate keeping the on-device data management well-informed about what blocks contain live data and what blocks do not. Flash and SMR share the property that their capacity is managed in pages. When a page contains only a small amount of live data, that page needs to be reclaimed, i.e., the live data coalesced (i.e., with data from other, similar pages), the page erased (flash), and returned to the unused page list. If the device has an out-of-date understanding of what data is live, it will coalesce unwanted, "dead" data, reducing its efficiency and overall performance. Thus, external actors have monitored storage devices and controlled them to reclaim space. Conventionally, a 'TRIM' command was used by file systems to inform storage devices (e.g., flash disk) about which blocks were no longer in use. The flash disk could then perform garbage collection of the unused blocks to mitigate the performance penalty associated with the unused blocks. However, this approach is still controlled, at least partially, off-disk or off-device. The storage device itself is not aware of which blocks are in use and which blocks are not in use. That knowledge is still maintained external to the storage device.

Some storage devices (e.g., SMR drives) perform device-specific garbage collection operations to reclaim space. The devices may need to perform unique operations due, for example, to the way data is laid out on the media in the device. An SMR drive may require assistance from a host to gain awareness of what areas or zones on the SMR drive contain active data. An SMR drive may also require assistance from a host to gain awareness of when it would be most effective to re-write data to consolidate space on the SMR drive. Once again, the storage device depends on the actions of a process or circuit located off the storage device.

Example apparatus and methods facilitate a storage device managing its own space independently from a client or host application. Example apparatus and methods may be performed on storage devices including, but not limited to, SMR drives, solid state drives (SSDs), and flash drives.

Figure 13:
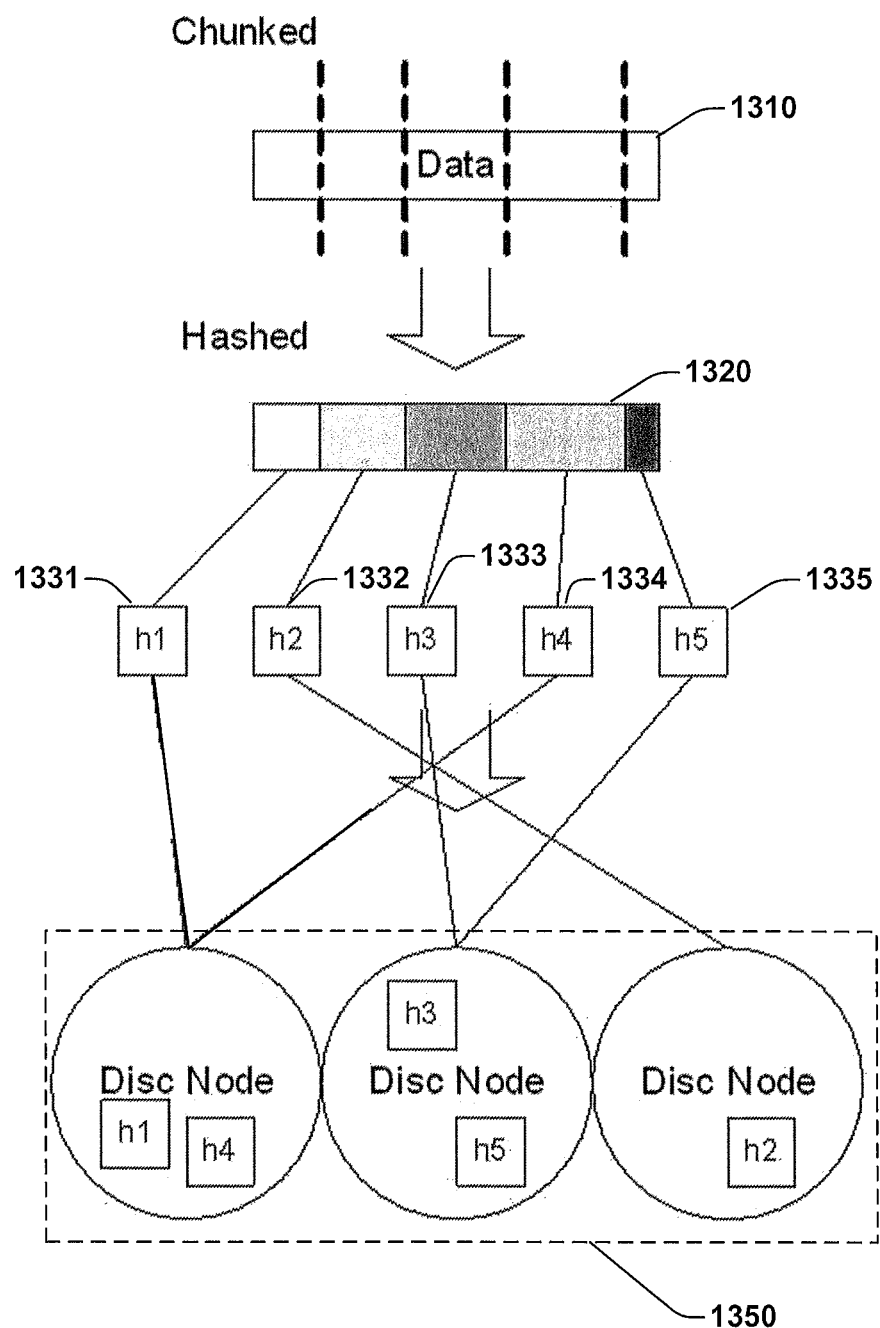
FIG. 13 illustrates one approach to storing data in an example apparatus.

FIG. 13 illustrates how data may be stored in an example apparatus. Data 1310 may be presented through protocols including, but not limited to, NFS, CIFS, object storage/S3, VTL, or FTP. In one embodiment, the data 1310 may coalesce in a transient cache. In another embodiment, the data 1310 may be processed directly in-line. The data 1310 is then broken into chunks by a chunking process or circuit. Different types of chunks (e.g., fixed size chunks, variable-length chunks) may be produced.

Once the data 1310 has been broken into chunks, a cryptographically strong hash is produced for a chunk. The cryptographically strong hash 1320 is produced by a hash function that produces hash values having a uniformly random distribution. The hash for a chunk (e.g. h1 1331 . . . h5 1335) is then used as an input to an appropriate data placement function. One example data placement function is CRUSH (Controlled Replication Under Scalable Hashing). Other deterministic data placement approaches may be employed. To be appropriate, the data placement function must be repeatable, consistent, and deterministic. Being repeatable, consistent, and deterministic means that given the same data (e.g., hash value) as an input, the data placement function will produce the same output or cause the same action.

The output of the data placement function is the identity of a target (e.g., disk, storage device) in a data storage system. A plurality of disc nodes 1350 may include targets. Targets are considered as separate, standalone devices. A target may take forms including a single disk or device, a logical representation of a device supported by additional logic or devices, a combination of physical or logical devices, or other forms.

In one embodiment, a client may operate in the following way. The identity of the target (e.g., disk, device) is used as the destination for the data chunk associated with the hash. In one embodiment, the client may query the target to determine whether the target already has the chunk associated with the hash. If the target disk does not have the chunk, then the client sends the chunk to the target. If the target already has the chunk, then the client does not send the chunk. In another embodiment, the client may automatically send the chunk to the target. If the target already has the chunk, then the target may discard the chunk and update a reference count to the chunk. If the target does not have the chunk, then the target may store the chunk and initialize a reference count to the chunk.

The target maintains a record of which chunks it has stored. The record may be maintained as, for example, an index. Since a data storage system may include multiple targets, and since the data placement function is repeatable and deterministic, no single target needs to maintain a record of all the chunks within the data storage system. The target may also, as part of the index, maintain a reference count of how many times a chunk has been provided to the target. This reference count tracks how many recipes rely on the chunk being available at the target. Having the reference count available on the target facilitates having the target perform its own garbage collection or other maintenance tasks without having to rely on an external actor.

Targets have a shard of what collectively forms an overall index that stores information about chunks in the data storage system. The index identifies which data chunks have been stored, while the reference counts identify how many recipes rely on the chunks. A chunk whose reference count is greater than zero is active and will be maintained by the target. A chunk whose reference count is zero is no longer active and may be a target for garbage collection or other reclamation. The combination of the sharded index and reference counts facilitates supporting data deduplication in a system that employs consistent hashing or another data directing function.

In one embodiment, a client can be configured to query a target before sending a chunk to a target. Alternately, a client can be configured to always send the chunk to the target and to let the target store or discard the chunk based on processing performed at the target. In one embodiment, whether a client queries a target before sending a chunk to the target may be negotiated as part of a protocol between the client and the target. In one embodiment, whether the client queries the target (e.g., k/v node) first may be negotiated or configured on an individual target basis or may be negotiated for an entire bulk ring. In one embodiment, whether the client queries the target first may be negotiated or configured on a per partition basis. Thus, an example system may include some targets that are queried first and other targets that are not queried first. In one embodiment, whether a target is queried first may depend on the size of the chunk being processed. Chunks that are above a threshold size (e.g., 1 MB) may cause a query to be sent while chunks that are below the threshold size may not cause a query to be sent. In one embodiment, whether a target is queried first may depend on current network conditions, target conditions, or communication conditions. For example, if a network is congested or suffering from diminished bandwidth, then a query may be sent, but if the network is experiencing no delays and operating at a high bit rate then no query may be sent. In one embodiment, whether a query is sent may be determined by a process that examines current conditions and balances the caching, processing, and communication costs before making a determination to query or not query.

Figure 14:
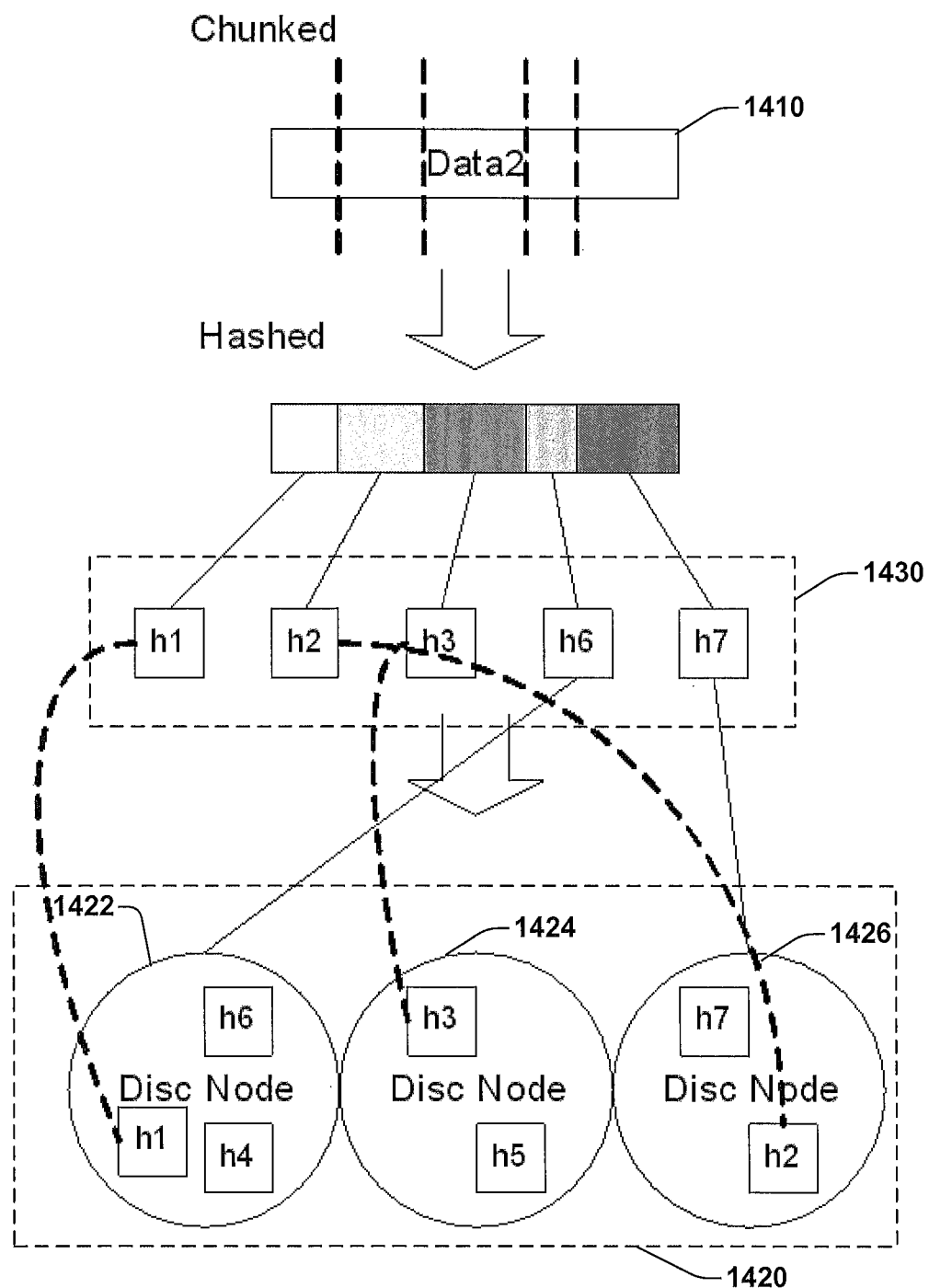
FIG. 14 illustrates additional data being presented to a data storage system.

FIG. 14 illustrates additional data 1410 being presented to a data storage system. The data 1410 is chunked and then hashed into hashes 1430 and a recipe (not shown) is prepared for the data 1410. Some of the chunks in this new piece of data 1410 are already present in target devices 1422, 1424, and 1426 in the collection of disc nodes 1420. Reference counts may be updated for these chunks. For example, reference counts may be updated for chunks associated with hash values h1, h2, and h3. Other chunks in this new piece of data 1410 are not present in target devices 1422, 1424, and 1426 in the collection of disc nodes 1420. These chunks may be stored at locations determined by a data placement function and reference counts may be established for the newly stored chunks. The shards of the indexes on the different targets may be updated to reflect the newly stored chunks and the updated reference counts for the previously stored chunks. This information may be stored on the target devices 1422, 1424, and 1426, which facilitates having the target devices 1422, 1424, and 1426 become self-aware to the point where the target devices 1422, 1424, and 1426 can perform their own garbage collection or other reclamation process.

Unlike conventional systems, individual targets (e.g., disks, storage devices) that store chunks are managed by the targets themselves. For example, a target may determine where the chunk is placed, may decide on the ordering for chunks, or may make other storage decisions. In one embodiment, where the target is an SSD, the target may manage the layout of pages. In another embodiment, where the target is an SMR drive, then the target may manage the layout of zones. In the SMR drive example, data may be laid out sequentially, as it is received, which may improve the efficiency of the SMR drive.

Target devices monitor the reference counts of the chunks they store. Monitoring reference counts facilitates targets being able to perform their own garbage collection or space reclamation. When an item (e.g., file, object) being stored by the data storage system is no longer needed, that item will be deleted. Deleting the item may include, for example, receiving a delete command from an upper level client or presentation layer. When the delete operation is processed, a sequence similar to the sequence associated with storing the data takes place with respect to communications with targets. Since the chunk is not being written, there is no need to send a chunk to a target. However, information about the deletion of the chunks associated with the recipe for the item being deleted is provided to the targets.

The recipe for the item being deleted is retrieved. Recall that a recipe is a representation of the hashes corresponding to the chunks that make up the original data item. The retrieved hashes are then input into the data placement function to determine which target devices hold the corresponding chunks. Instead of a store operation being sent to a target, a delete operation is sent to the target. When there are multiple chunks in the recipe, then multiple delete operations may be sent to multiple targets. Targets may then decrement the reference count for the chunk. When the reference count for a chunk reaches zero, then that chunk becomes a candidate for actual deletion by the target. Conversely, during store operations, when the reference count for a chunk reaches a threshold level that indicates that this chunk is used in many recipes, then the chunk may be replicated or the chunk may be cached in a high speed device to facilitate easier retrieval.

By storing a shard of the index and reference counts, a target will have information upon which data reclamation or other operations may be based. For example, an SSD may be aware of which chunks are no longer used and can, therefore, be trimmed. Similarly, an SMR drive may have information about how many chunks stored within a particular zone are no longer used. When a threshold number of chunks no longer used is reached, then a zone may be rewritten or compacted. This approach provides the benefits of a drive-managed SMR but without the conventional penalties. The threshold number of chunks may be based on an SLA, or may be dynamically adjustable. In one embodiment, performance of these autonomic space reclamation activities may be decoupled from the operation of the rest of the system.

Figure 15:
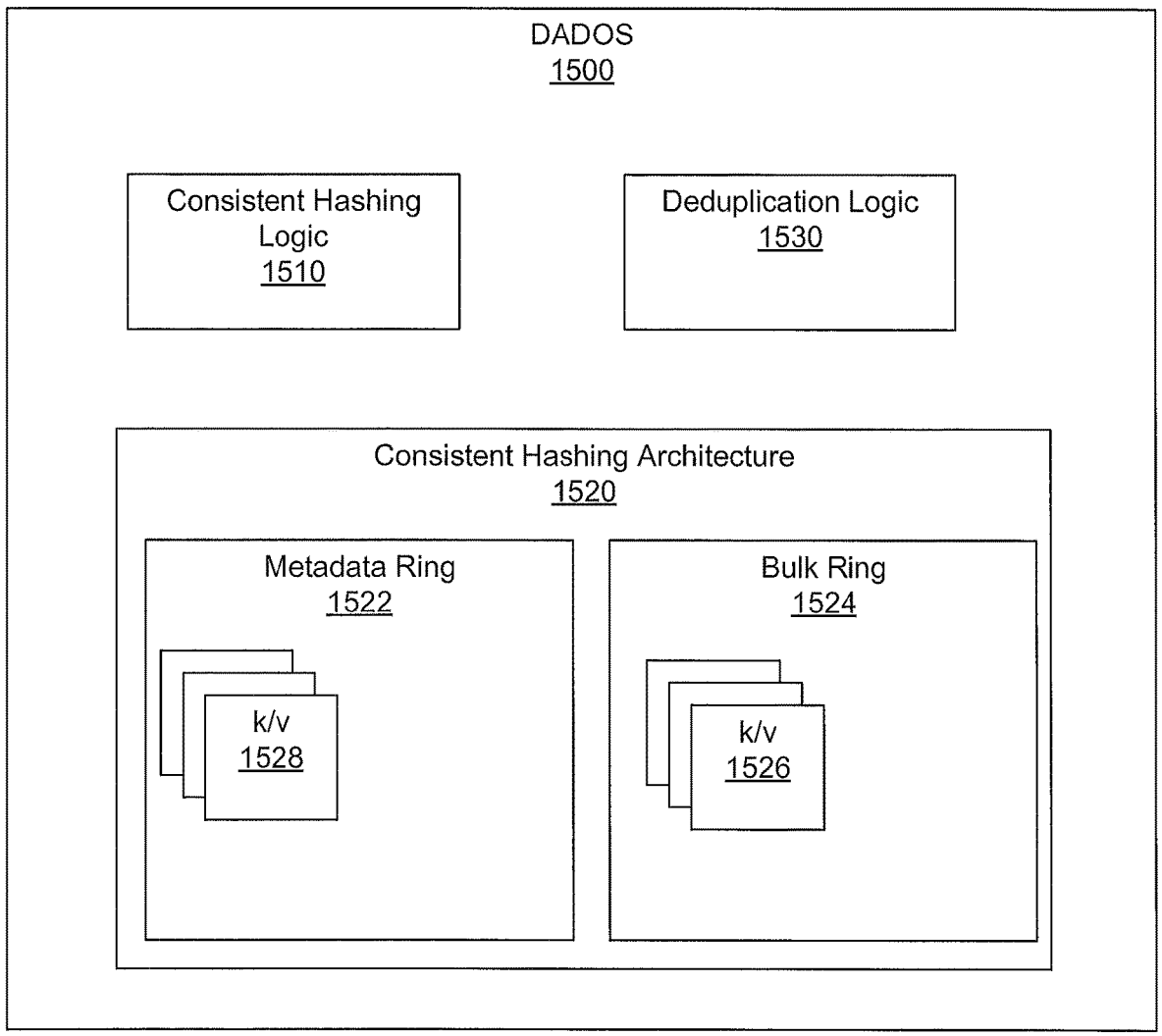
FIG. 15 illustrates an example data aware deduplicating object store.

FIG. 15 illustrates an example data aware deduplication object store 1500. Data aware deduplication object store 1500 includes a consistent hashing logic 1510, a consistent hashing architecture 1520, and a deduplication logic 1530. Consistent hashing logic 1510 manages consistent hashing architecture 1520 for data aware deduplication object store 1500. Consistent hashing architecture 1520 includes a metadata ring 1522 and a bulk ring 1524. Deduplication logic 1530 provides data deduplication for data to be stored in the object store.

In one embodiment, deduplication logic 1530 performs variable length deduplication. In another embodiment, deduplication logic 1530 provides a shared nothing approach.

In one embodiment, consistent hashing architecture 1520 is a dual ring architecture comprising a metadata ring 1522 and a bulk ring 1524. In another embodiment, consistent hashing architecture 1520 is a multiple ring architecture comprising a metadata ring 1522 and two or more bulk rings. In another embodiment, consistent hashing architecture 1520 comprises other, different numbers of metadata rings or bulk rings.

In one embodiment, different members of the two or more bulk rings have different properties. Different members of the two or more bulk rings may also have different numbers or types of devices. The different types of devices may include, for example, disk drives, tape drives, solid state devices, SMR drives, or other types of storage devices.

In one embodiment, bulk ring 1524 may include one or more k/v data stores 1526. A k/v data store 1526 may have an individual approach to data protection. The individual approach to data protection may be an erasure coding approach, a RAID approach, or a replication approach. In another embodiment, other approaches to data protection may be employed. Metadata ring 1522 may also include one or more k/v data stores 1528. A k/v data store 1528 may have also an individual approach to data protection.

In one embodiment, a k/v data store 1526 has an individual approach to power management. The k/v data store 1526 may also have an individual approach to garbage collection or data reclamation. The k/v data store 1526 may store a shard of an index and a reference count that facilitates the individual approach to garbage collection or data reclamation. The k/v data store 1526 may perform its own garbage collection or data reclamation.

In one embodiment, data aware deduplicating object store 1500 includes a hierarchy of data protection. The hierarchy of data protection includes performing replication at a higher level during ingest and performing erasure coding at a lower level after deduplication has been performed.

In one embodiment, a k/v data store (e.g. k/v data store 1526) may store both data and work to be performed on the data. Work to be performed on the data may be data awareness work. In another embodiment, the work to be performed on the data is content based searching, or virus checking.

In one embodiment, consistent hashing logic 1510 and deduplication logic 1530 provide indirect pattern recognition of content stored in a k/v data store. For example, consistent hashing logic 1510 and deduplication logic 1530 may provide indirect pattern recognition of content stored in k/v data stores 1526. The indirect pattern recognition may be provided using hash based signatures of less than an entire item. For example, the indirect pattern recognition may be based on a subset of chunks that is less than all the chunks associated with data stored in, for example, bulk ring 1524.

In one embodiment, consistent hashing logic 1510 and deduplication logic 1530 provide a sharded Bloom filter. The sharded Bloom filter stores information about chunks stored in the data store. In one embodiment, the sharded Bloom filter is stored above the metadata ring 1522. In another embodiment, the sharded Bloom filter is stored below the metadata ring 1522. In another embodiment, a first portion of the sharded Bloom filter is stored below the metadata ring 1522 and a second, different portion of the sharded Bloom filter is stored above the metadata ring 1522. The ratio between the size of the portion of the sharded Bloom filter stored below and the portion of the sharded Bloom filter stored above the metadata ring 1522 may be based on a service level agreement, upon a property of the metadata ring 1522, upon operating conditions associated with data aware deduplicating object store 1500, may be adjusted automatically dynamically by consistent hashing logic 1510, or may be user adjustable.

In one embodiment, consistent hashing logic 1510 and deduplication logic 1530 provide a combined bottom up and top down self-awareness and self publishing function for individual k/v data stores.

Figure 16:
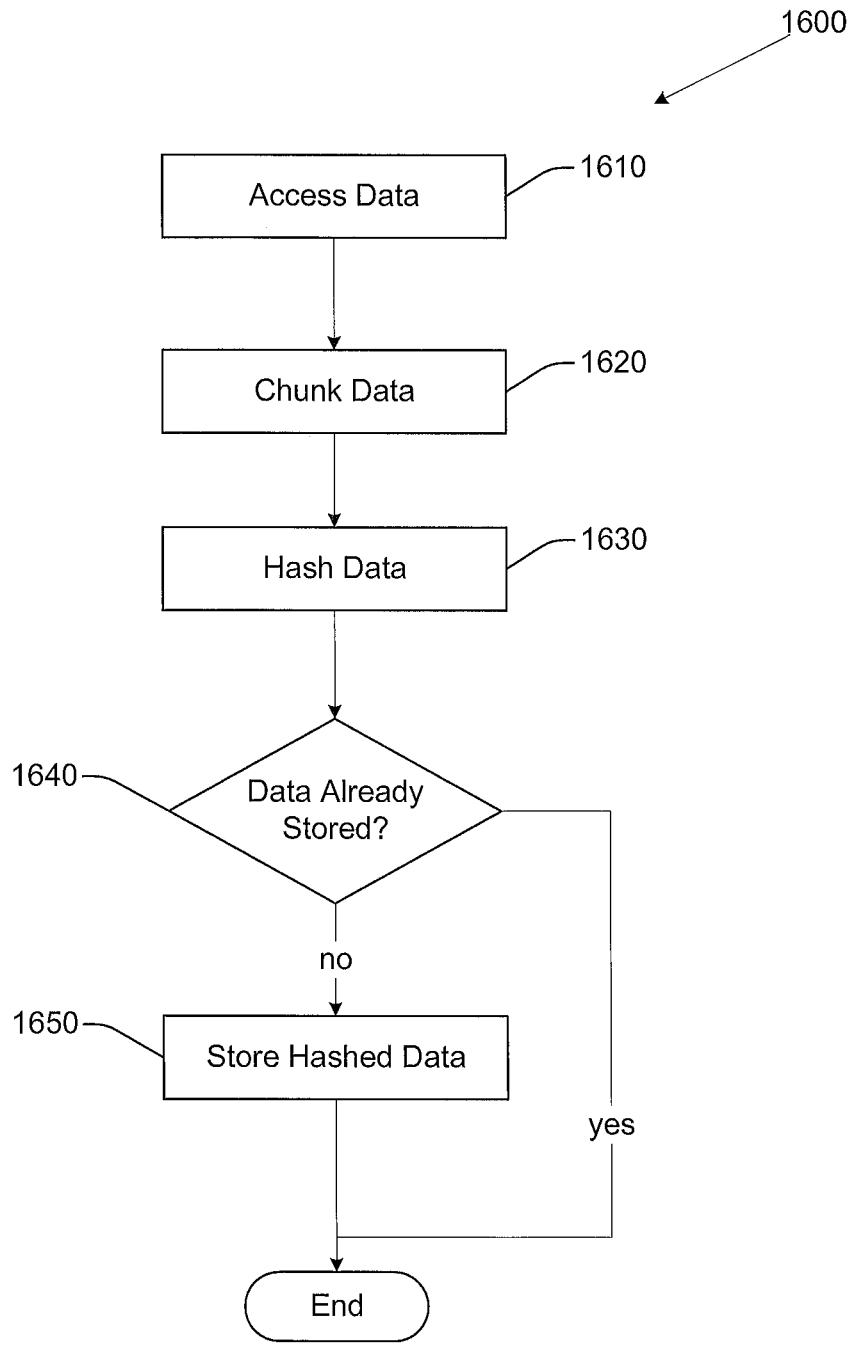
FIG. 16 illustrates an example method for data aware deduplication object storage.

FIG. 16 illustrates an example method 1600. Method 1600 includes, at 1610, accessing a first set of electronic data. The first set of electronic is to be stored in a data aware deduplicating object store. The data aware deduplicating object store includes a consistent hashing architecture. The consistent hashing architecture is a dual-ring architecture comprising a metadata ring and a bulk ring. In one embodiment, the consistent hashing architecture is a multiple-ring architecture including a metadata ring and two or more bulk rings. Accessing the first set of electronic data may include retrieving electronic data from a computer memory, receiving a computer file over a computer network, or other computer or electronic based action.

Method 1600 also includes, at 1620, chunking the first set of electronic data. Method 1600, at 1620, chunks the first set of electronic data into a set of data chunks using a variable length deduplication approach. In one embodiment, the deduplication approach provides a shared nothing approach. In another embodiment, other deduplication approaches may be employed.

Method 1600 also includes, at 1630, generating a hashed chunk by hashing a member of the set of data chunks. Method 1600 may hash the member of the set of data chunks using a cryptographic hash function. The cryptographic hash function may be, for example, an MD5 hash function, an SHA-256 hash function, or other hash function.

Method 1600 also includes, at 1640, determining if the data chunk has already been stored in a member of a collection of k/v nodes in the data aware deduplicating data store. Determining if the data chunk has already been stored may include comparing a hashed chunk value with hash values stored in the k/v node. Upon determining that the data chunk has already been stored, method 1600 may terminate.

Upon determining that the hashed chunk has not already been stored in the k/v node, method 1600 continues to step 1650. Method 1600 includes, at 1650, storing the hashed chunk in the member of the collection of k/v nodes. The collection of k/v nodes implements a consistent hashing ring.

In one embodiment, a first member of the collection of k/v nodes stores a first index shard in a flash memory and a first hashed chunk in a first type of storage device. The first type of storage device may be a solid state drive (SSD), a hard disk drive (HDD), or a shingled magnetic recording (SMR) drive. A second different member of the collection of k/v nodes stores a second, different index shard in a second, different flash memory, and a second, different hashed chunk in a second, different type of storage device. The second, different type of storage device is an SSD, an HDD, or an SMR drive.

In one embodiment, a first member of the collection of k/v nodes has a first individual approach to power management. A second, different member of the collection of k/v nodes has a second, different individual approach to power management. The first member of the collection of k/v nodes may also have a first individual approach to garbage collection or data reclamation. The second, different member of the collection of k/v nodes may have a second, different individual approach to garbage collection or data reclamation. The first or second individual approach to power management, or the first or second individual approach to garbage collection or data reclamation may be adjusted dynamically based, at least in part, on operating conditions associated with the collection of k/v nodes or on operating conditions associated with the data aware deduplicating data store. In one embodiment, a member of the collection of k/v nodes stores a shard of an index and a reference count. The shard of the index or the reference count facilitates the individual approach to garbage collection or data reclamation. The member of the collection of k/v nodes may perform its own garbage collection or data reclamation.

In one embodiment, a member of the collection of k/v nodes stores hashed chunks and work to be performed on the data. In this embodiment, method 1600 further includes storing, on the member of the collection of k/v nodes, work to be performed on data associated with a hashed chunk stored on the member of the collection of k/v nodes. The work to be performed on the first set of electronic data may be data awareness work, content based searching, or virus checking. In another embodiment, other types of work may be stored.

In one embodiment, method 1600 further comprises performing indirect pattern recognition of content stored in a member of the collection of k/v nodes. Method 1600 may perform the indirect pattern recognition using hash based signatures of less than an entire item. For example, indirect pattern recognition may be performed on a subset of hashed chunks that is smaller than the set of data chunks.

In one embodiment, method 1600 further comprises storing, in a sharded Bloom filter, information about hashed chunks stored in the data aware deduplicating object store.

The sharded Bloom filter may be stored above the metadata ring, or the sharded Bloom filter may be stored below the metadata ring. In one embodiment, a first portion of the sharded Bloom filter is stored above the metadata ring, and a second, different portion of the sharded Bloom filter is stored below the metadata ring. The ratio describing the size of the first portion of the sharded Bloom filter and the second portion of the sharded Bloom filter may be based, at least in part, on a service level agreement or a data protection policy. The ratio may be automatically dynamically adjusted based on operating conditions associated with the data aware deduplicating object store.

Figure 17:
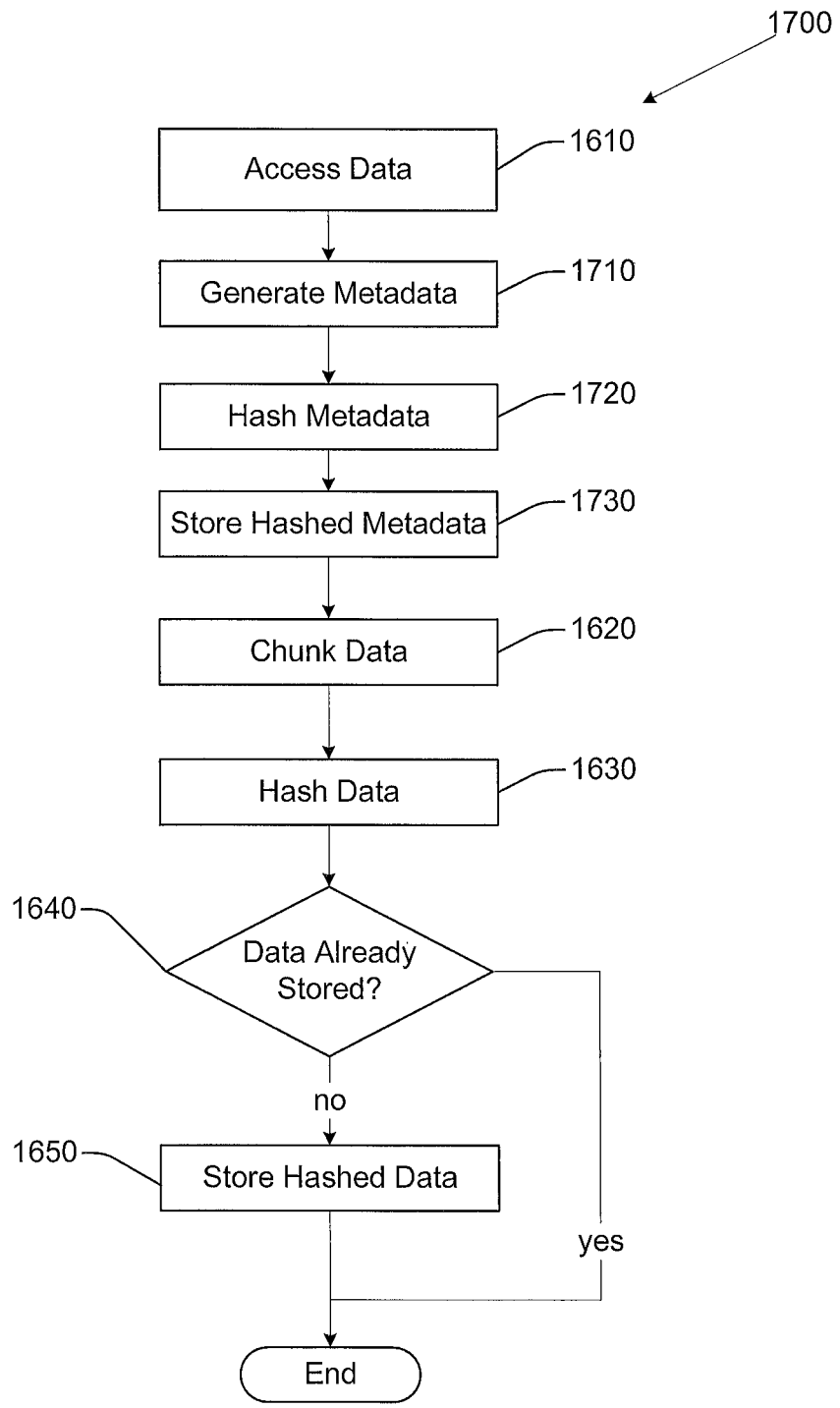
FIG. 17 illustrates an example method for data aware deduplication object storage.

FIG. 17 illustrates a method 1700. Method 1700 is similar to method 1600, but includes additional steps and details. Method 1700 includes, at 1610, accessing a first set of electronic data. Method 1700 also includes, at 1710, generating a set of metadata about the first set of electronic data. The metadata includes a recipe associated with the first set of electronic data.

Method 1700 also includes, at 1720, computing a hash of the metadata. The hash of the metadata may be computed using a cryptographic hash function.

Method 1700 also includes, at 1730, storing the hash of the metadata in a member of the collection of k/v nodes. The member of the collection of k/v nodes may be selected based on the hash value. In one embodiment, storing the hash of the metadata includes storing the hash of the metadata on a member of the collection of k/v nodes that does not store a hashed chunk.

Method 1700 also includes steps 1620, 1630, 1640, and 1650, which are similar to steps 1620, 1630, 1640, and 1650 described with respect to method 1600.

Figure 18:
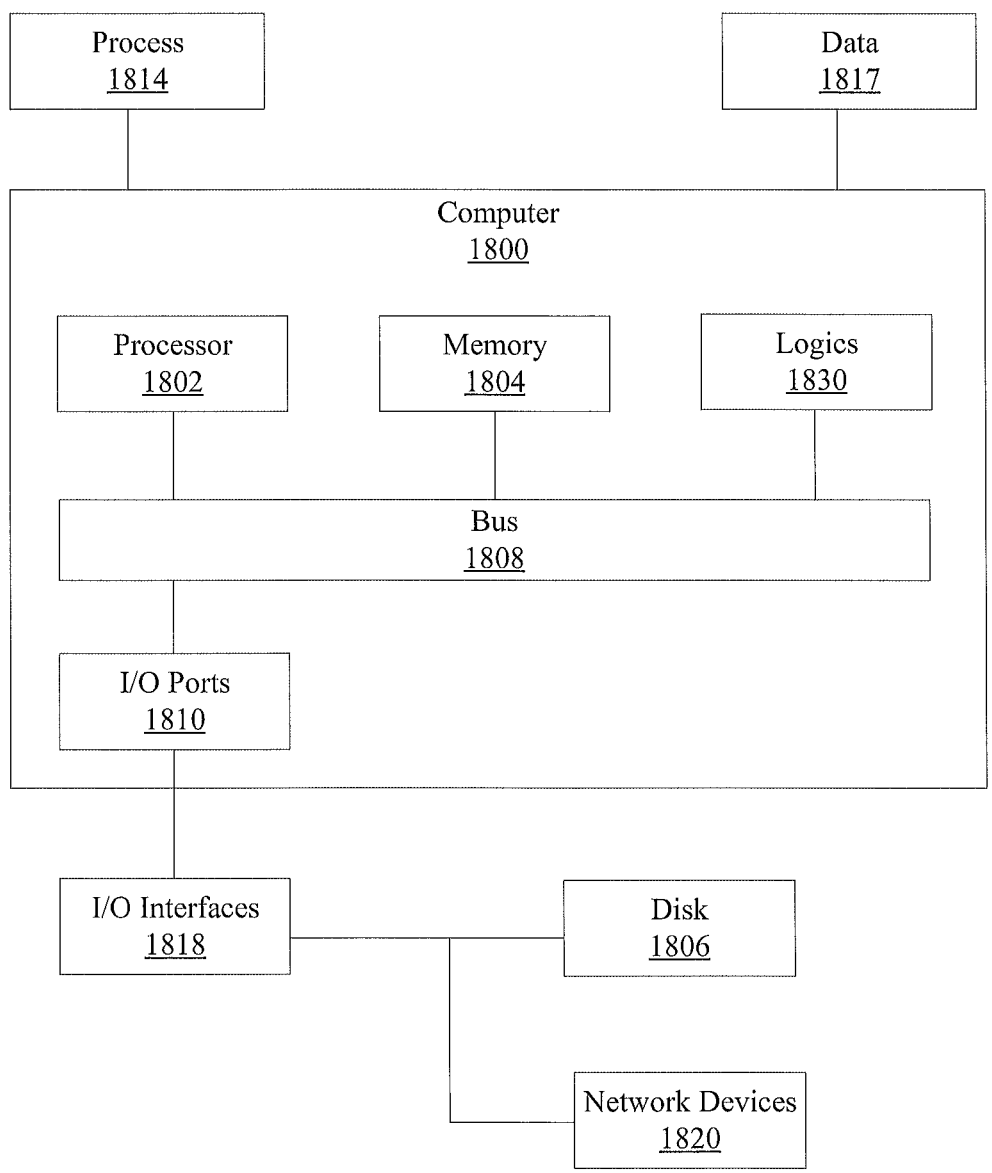
FIG. 18 illustrates an example computer in which example methods, apparatus, and other embodiments may be implemented.

FIG. 18 illustrates an example computing device in which example systems, methods, and other embodiments described herein, and equivalents, may operate. The example computing device may be a computer 1800 that includes a processor 1802, a memory 1804, and input/output ports 1810 operably connected by a bus 1808. In one example, the computer 1800 may include a data aware deduplication object store logic 1830 that controls the distribution of chunks of data, hashed chunks, metadata, recipes, or erasure codes between devices available to data aware deduplicating data store logic 1830. In different examples, the logic 1830 may be implemented in hardware, software, firmware, and/or combinations thereof. While logic 1830 is illustrated as a hardware component attached to the bus 1808, it is to be appreciated that in one example, logic 1830 could be implemented in the processor 1802.

In one embodiment, logic 1830 may provide means (e.g., hardware, firmware, circuit) for managing a consistent hashing architecture associated with the data aware deduplicating data store. The consistent hashing architecture may include a multiple ring architecture that includes at least one metadata ring and at least one bulk ring. The at least one metadata ring includes one or more k/v data stores. The at least one bulk ring includes one or more k/v data stores.

Logic 1830 may also provide means (e.g., hardware, firmware, circuit) for hashing data to be stored in the data aware deduplicating data store. Logic 1830 may provide means to hash data using a cryptographic hash function, including an MD5 hash function, an SHA-256 hash function, or other cryptographic hash function.

Logic 1830 may also provide means (e.g., hardware, firmware, circuit) for deduplicating data to be stored in the data aware deduplicating data store. Logic 1830 may provide means for deduplicating data using a variable length deduplication approach, and/or a shared nothing approach.

Logic 1830 may also provide means (e.g., hardware, firmware, circuit) for storing, in the metadata ring, metadata associated with the data. The metadata may include a recipe. The recipe may include locations of chunks associated with the data.

Logic 1830 may also provide means (e.g. hardware, firmware, circuit) for storing deduplicated data in the bulk ring.

Logic 1830 may also provide means (e.g. hardware, firmware, circuit) for managing power of a k/v data store or for managing garbage collection for the k/v data store. Logic 1830 may provide means for managing power at an individual k/v data store level.

Logic 1830 may also provide means (e.g. hardware, firmware, circuit) for storing, in the k/v data store, work to be performed on the data stored in the k/v data store. Work to be performed may include data awareness work, content based searching, or virus checking.

Logic 1830 may also provide means (e.g. hardware, firmware, circuit) for performing virus checking on the data using the means for hashing data and the means for deduplicating data. Logic 1830 may also provide means for performing data awareness work or content based searching.

The means associated with logic 1830 may be implemented, for example, as an ASIC that implements the functionality of apparatus, methods, and other embodiments described herein. The means may also be implemented as computer executable instructions that implement the functionality of methods described herein and that are presented to computer 1800 as data 1817 that are temporarily stored in memory 1804 and then executed by processor 1802.

Generally describing an example configuration of the computer 1800, the processor 1802 may be a variety of various processors including dual microprocessor and other multi-processor architectures. A memory 1804 may include volatile memory and/or non-volatile memory. Non-volatile memory may include, for example, ROM, PROM, and other memory. Volatile memory may include, for example, RAM, SRAM, DRAM, and other memory.

A disk 1806 may be operably connected to the computer 1800 via, for example, an input/output interface (e.g., card, device) 1818 and an input/output port 1810. The disk 1806 may be, for example, a magnetic disk drive, a solid state disk drive, a floppy disk drive, a tape drive, a Zip drive, a flash memory card, a memory stick, or other device. Furthermore, the disk 1806 may be a CD-ROM drive, a CD-R drive, a CD-RW drive, a DVD ROM drive, a Blu-Ray drive, an HD-DVD drive, or other device. The memory 1804 can store a process 1814 and/or a data 1817, for example. The disk 1806 and/or the memory 1804 can store an operating system that controls and allocates resources of the computer 1800.

The bus 1808 may be a single internal bus interconnect architecture and/or other bus or mesh architectures. While a single bus is illustrated, it is to be appreciated that the computer 1800 may communicate with various devices, logics, and peripherals using other busses (e.g., PCIE, 1394, USB, Ethernet). The bus 1008 can be types including, for example, a memory bus, a memory controller, a peripheral bus, an external bus, a crossbar switch, and/or a local bus.

The computer 1800 may interact with input/output (i/o) devices via the i/o interfaces 1818 and the input/output ports 1810. Input/output devices may be, for example, a keyboard, a microphone, a pointing and selection device, cameras, video cards, displays, the disk 1806, the network devices 1820, and other devices. The input/output ports 1810 may include, for example, serial ports, parallel ports, and USB ports.

The computer 1800 can operate in a network environment and thus may be connected to the network devices 1820 via i/o interfaces 1818, and/or i/o ports 1810. Through the network devices 1820, the computer 1800 may interact with a network. Through the network, the computer 1800 may be logically connected to remote computers. Networks with which the computer 1800 may interact include, but are not limited to, a LAN, a WAN, or other networks.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a non-transitory computer-readable medium that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, a data storage device, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"User", as used herein, includes but is not limited to one or more persons, software, logics, applications, computers or other devices, or combinations of these.

"Logic", as used herein, includes but is not limited to hardware, firmware, software in execution on a machine, or combinations of each to perform a function(s) or an action(s), or to cause a function or action from another logic, circuit, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other logic components. Where multiple logical logics are described, it may be possible to incorporate the multiple logics into one physical logic or circuit. Similarly, where a single logical logic is described, it may be possible to distribute that single logic between multiple logics or circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A data aware deduplicating object store, comprising:
   a collection of storage devices, wherein each device includes a processor and non-transitory storage medium storing instructions that cause the processor to perform corresponding functions;
   a consistent hashing logic configured to:
      receive a first item having a first item identifier;
      break data of the item into at least two chunks;
      perform a first hash function on each chunk to generate a recipe comprising respective chunk identifiers of the at least two chunks;
      perform a second hash function on the item identifier to determine a metadata location on a metadata ring of a dual ring architecture;
      store the recipe in the metadata location;
      provide respective chunk identifiers and chunks for storing in a bulk ring of the dual ring architecture; and
   a deduplication logic configured to:
      receive the chunk identifiers and chunks from the consistent hashing logic;
      access a plurality of Bloom filter shards, wherein each Bloom filter shard stores information about chunks of data stored in an associated key/value data store of the bulk ring, to perform deduplication on each chunk based on the chunk identifier for the chunk to determine whether the chunk is a duplicate chunk already present in the bulk ring;
      increment a respective reference count for each respective chunk identifier based on the recipe including the respective chunk, wherein the reference count facilitates garbage collection or data reclamation; and
      when the chunk of data is a duplicate chunk, refrain from providing the duplicate chunk to the bulk ring for storing.

2. The data aware deduplicating object store of claim 1, where the deduplication logic performs variable length deduplication.

3. The data aware deduplicating object store of claim 1, wherein the metadata ring and the bulk ring comprise different memory devices.

4. The data aware deduplicating object store of claim 1, where different memory devices in the bulk ring have different properties.

5. The data aware deduplicating object store of claim 1, where each key/value data store comprises a key corresponding to the hash of a chunk of data and a value corresponding to data in the chunk of data.

6. The data aware deduplicating object store of claim 1, where a first key/value data store in the bulk ring utilizes a first data protection scheme and a second key/value data store in the bulk ring utilizes a second data protection scheme that is different from the first data protection scheme, wherein a data protection scheme comprises an erasure coding approach, a RAID approach, or a replication approach.

7. The data aware deduplicating object store of claim 1, where a first key/value data store in the bulk ring utilizes a first power management scheme and a second key/value data store in the bulk ring utilizes a second power management scheme that is different from the first power management scheme.

8. The data aware deduplicating object store of claim 1, where a first key/value data store in the bulk ring utilizes a first garbage collection or data reclamation scheme and a second key/value data store in the bulk ring utilizes a second garbage collection or data reclamation scheme that is different from the first garbage collection or data reclamation scheme.

9. The data aware deduplicating object store of claim 8, where a key/value data store stores a shard of an index and a reference count that facilitates the first and second garbage collection or data reclamation schemes.

10. The data aware deduplicating object store of claim 9, where a key/value data store performs its own garbage collection or data reclamation.

11. The data aware deduplicating object store of claim 1, where the consistent hashing logic is configured to perform replication during ingest and erasure coding after deduplication has been performed.

12. The data aware deduplicating object store of claim 1, where the consistent hashing logic and the deduplication logic provide indirect pattern recognition of content stored in the key/value data store using hash based signatures of less than an entire item.

13. A non-transitory computer-readable storage device storing computer-executable instructions that when executed by a computer control the computer to perform a method, the method comprising:
    accessing a first set of electronic data to be stored in a data aware deduplicating object store comprising a collection of storage devices, where the data aware deduplicating data store comprises a consistent hashing architecture, where the consistent hashing architecture is a dual-ring architecture comprising a metadata ring and a bulk ring, where the metadata ring comprises a first set of key/value (k/v) nodes and the bulk ring comprises a second set of k/v nodes;
    chunking the first set of electronic data into a set of data chunks using a variable length deduplication approach;
    generating a set of hashed chunk and chunk identifier pairs by hashing each member of the set of data chunks to generate a chunk identifier for the chunk, wherein the chunk identifiers comprise a recipe for the first set of electronic data;
    hashing an identifier for the first set of electronic data to generate a metadata location on the metadata ring;
    storing the recipe in the metadata location;
    providing the set of hashed chunks for storing in the bulk ring;
    access a plurality of Bloom filter shards, wherein each Bloom filter shard stores information about chunks of data stored in an associated key/value data store of the bulk ring, to determine whether the hashed chunk has already been stored in the bulk ring;
    incrementing a respective reference count for each respective chunk identifier based on the recipe including the respective chunk, wherein the reference count facilitates garbage collection or data reclamation; and
    refraining from storing a hashed chunk of the set in the bulk ring upon determining that the hashed chunk has already been stored in the bulk ring.

14. The non-transitory computer-readable storage device of claim 13, where storing the chunk identifiers includes storing the chunk identifiers on a k/v node that does not store a hashed chunk.

15. The non-transitory computer-readable storage device of claim 13, where a first k/v node stores a first index shard in a first flash memory, and a first hashed chunk in a first type of storage device, where the first type of storage device is a solid state drive (SSD), a hard disk drive (HDD), or a shingled magnetic recording (SMR) drive.

16. The non-transitory computer-readable storage device of claim 15, where a second, different k/v node stores a second index shard in a second flash memory, and a second hashed chunk in a second, different type of storage device, where the second, different type of storage device is a solid state drive (SSD), a hard disk drive (HDD), or a shingled magnetic recording (SMR) drive.

17. The non-transitory computer-readable storage device of claim 13, where a first k/v node employs a first power management scheme, and where a second k/v node employs a second, different power management scheme.

18. The non-transitory computer-readable storage device of claim 13, where a first k/v node employs a first garbage collection or data reclamation scheme, and where a second, different k/v node employs a second, different garbage collection or data reclamation scheme.

19. The non-transitory computer-readable storage device of claim 18, where a k/v node stores a shard of an index and a reference count, where the shard of the index or the reference count facilitates garbage collection or data reclamation.

20. The non-transitory computer-readable storage device of claim 19, where the k/v node performs its own garbage collection or data reclamation.

21. The non-transitory computer-readable storage device of claim 13, further comprising storing content based searching work, or virus checking work on the k/v node.

22. The non-transitory computer-readable storage device of claim 21, where virus checking includes performing indirect pattern recognition of content stored in a k/v node using hash based signatures of less than an entire item.

23. A system for data aware deduplication object storage, the system comprising:
    an object store;
    means for managing a consistent hashing architecture associated with the object store, where the consistent hashing architecture is a multiple ring architecture comprising at least one metadata ring and at least one bulk ring, where the at least one metadata ring includes one or more key/value (k/v) data stores, and where the at least one bulk ring includes one or more k/v data stores;
means for receiving a first item having a first item identifier;
means for breaking the item into at least two chunks;
means for hashing each chunk to generate respective chunk identifiers, wherein the chunk identifiers comprise a recipe for the first item;
means for hashing the item identifier to determine a metadata location on the metadata ring;
means for storing the recipe in the metadata location;
means for providing the chunk identifiers and the chunks for storing in the bulk ring at a bulk ring location;
means for deduplicating data to be stored in the object store based on the chunk identifiers using a variable length deduplication approach;
means for storing deduplicated data in the bulk ring;
wherein the means for deduplicating is configured to refrain from providing duplicate data to the means for storing deduplicated data in the bulk ring; and
means for power management of a k/v data store or garbage collection for the k/v data store at an individual level.

* * * * *